US008100760B2

(12) United States Patent
Cannon

(10) Patent No.: US 8,100,760 B2
(45) Date of Patent: Jan. 24, 2012

(54) METHODS AND APPARATUS FOR A COMPETITIVE BONUS GAME WITH VARIABLE ODDS

(75) Inventor: Lee E. Cannon, Bozeman, MT (US)

(73) Assignee: IGT, Reno, NV (US)

( * ) Notice: Subject to any disclaimer, the term of this patent is extended or adjusted under 35 U.S.C. 154(b) by 383 days.

(21) Appl. No.: 11/871,837

(22) Filed: Oct. 12, 2007

(65) Prior Publication Data

US 2008/0032764 A1 Feb. 7, 2008

Related U.S. Application Data

(63) Continuation of application No. 10/625,397, filed on Jul. 23, 2003, now Pat. No. 7,314,408.

(51) Int. Cl.
*A63F 13/00* (2006.01)

(52) U.S. Cl. ................................ 463/25; 463/27; 463/42

(58) Field of Classification Search .................... 463/25, 463/42, 27

See application file for complete search history.

(56) References Cited

U.S. PATENT DOCUMENTS 3,281,149 A 10/1966 Miller
4,339,798 A 7/1982 Hedges et al.
4,582,324 A 4/1986 Koza et al.
4,669,731 A 6/1987 Clarke
4,695,053 A 9/1987 Vazquez, Jr. et al.
4,700,948 A 10/1987 Okada
4,743,024 A 5/1988 Helm et al.
4,775,155 A 10/1988 Lees
4,805,907 A 2/1989 Hagiwara
4,817,951 A 4/1989 Crouch et al.
4,836,546 A 6/1989 DiRe et al.
4,837,728 A 6/1989 Barrie et al.
4,856,787 A 8/1989 Itkis
4,871,171 A 10/1989 Rivero
4,906,005 A 3/1990 Manabe
5,083,271 A 1/1992 Thacher et al.
5,152,529 A 10/1992 Okada (Continued)

FOREIGN PATENT DOCUMENTS

AU 199944641 4/2000

(Continued)

OTHER PUBLICATIONS

Advertisement, Bally Distributing Company, Double or Nothing, Model 1083, Ch. 11, 1975-1984, p. 267.

(Continued)

*Primary Examiner* — David L Lewis
*Assistant Examiner* — William H McCulloch, Jr.
(74) *Attorney, Agent, or Firm* — K&L Gates LLP

(57) ABSTRACT

A bonus controller for generating a competitive bonus game in a gaming system, the bonus controller having a processor and a memory coupled to the processor. The bonus controller being programmed to: receive wagering data corresponding to a casino game, enter a first player associated with a first gaming apparatus into the competitive bonus game when the first player obtains a qualifying win at the casino game, determine odds for the first player to win the competitive bonus game, vary odds of winning the competitive bonus game for at least a second player after entering the first player into the competitive bonus game, the second player having been previously entered into the competitive bonus game, determine an outcome of the competitive bonus game, and transmit data corresponding to the outcome of the competitive bonus game to a display unit.

14 Claims, 22 Drawing Sheets

U.S. PATENT DOCUMENTS

| | | | | |
|---|---|---|---|---|
| 5,167,413 | A | 12/1992 | Fulton | |
| 5,186,460 | A | 2/1993 | Fongeallaz et al. | |
| 5,205,555 | A | 4/1993 | Hamann | |
| 5,242,163 | A | 9/1993 | Fulton | |
| 5,259,616 | A | 11/1993 | Bergmann | |
| 5,265,874 | A | 11/1993 | Dickinson et al. | |
| 5,275,400 | A | 1/1994 | Weingardt et al. | |
| 5,288,081 | A | 2/1994 | Breeding | |
| 5,290,033 | A | 3/1994 | Bittner et al. | |
| 5,299,810 | A | 4/1994 | Pierce et al. | |
| 5,342,049 | A | 8/1994 | Wichinsky et al. | |
| 5,344,145 | A | 9/1994 | Chadwick et al. | |
| 5,393,057 | A | 2/1995 | Marnell, II | |
| 5,397,125 | A | 3/1995 | Adams | |
| 5,411,271 | A | 5/1995 | Mirando | |
| 5,417,430 | A | 5/1995 | Breeding | |
| 5,472,197 | A | 12/1995 | Gwiasda et al. | |
| 5,486,005 | A | 1/1996 | Neal | |
| 5,511,781 | A | 4/1996 | Wood et al. | |
| 5,536,016 | A | 7/1996 | Thompson | |
| 5,544,892 | A | 8/1996 | Breeding | |
| 5,560,603 | A | 10/1996 | Seelig et al. | |
| 5,564,700 | A | 10/1996 | Celona | |
| 5,564,701 | A | 10/1996 | Dettor | |
| 5,569,083 | A | 10/1996 | Fioretti | |
| 5,569,603 | A | 10/1996 | Tripp et al. | |
| 5,580,309 | A | 12/1996 | Piechowiak et al. | |
| 5,609,337 | A | 3/1997 | Clapper, Jr. | |
| 5,611,730 | A | 3/1997 | Weiss | |
| 5,628,684 | A | 5/1997 | Bouedec | |
| 5,630,753 | A | 5/1997 | Fuchs | |
| 5,639,089 | A | 6/1997 | Matsumoto et al. | |
| 5,641,730 | A | 6/1997 | Brown | |
| 5,645,486 | A | 7/1997 | Nagao et al. | |
| 5,647,798 | A | 7/1997 | Falciglia | |
| 5,655,961 | A | 8/1997 | Acres et al. | |
| 5,664,998 | A | 9/1997 | Seelig et al. | |
| 5,695,402 | A | 12/1997 | Stupak | |
| 5,707,285 | A | 1/1998 | Place et al. | |
| 5,722,891 | A | 3/1998 | Inoue | |
| 5,741,183 | A | 4/1998 | Acres et al. | |
| 5,752,882 | A | 5/1998 | Acres et al. | |
| 5,755,619 | A | 5/1998 | Matsumoto et al. | |
| 5,758,875 | A | 6/1998 | Giacalone, Jr. | |
| 5,761,647 | A | 6/1998 | Boushy | |
| 5,769,716 | A | 6/1998 | Saffari et al. | |
| 5,772,509 | A * | 6/1998 | Weiss | 463/16 |
| 5,779,242 | A | 7/1998 | Kaufmann | |
| 5,779,544 | A | 7/1998 | Seelig et al. | |
| 5,779,549 | A | 7/1998 | Walker et al. | |
| 5,788,573 | A | 8/1998 | Baerlocher et al. | |
| 5,806,045 | A | 9/1998 | Biorge et al. | |
| 5,816,918 | A | 10/1998 | Kelly et al. | |
| 5,820,459 | A | 10/1998 | Acres et al. | |
| 5,820,460 | A | 10/1998 | Fulton | |
| 5,823,874 | A | 10/1998 | Adams | |
| 5,830,063 | A * | 11/1998 | Byrne | 463/18 |
| 5,833,536 | A | 11/1998 | Davids et al. | |
| 5,833,537 | A | 11/1998 | Barrie | |
| 5,836,817 | A | 11/1998 | Acres et al. | |
| 5,848,932 | A | 12/1998 | Adams | |
| 5,851,148 | A | 12/1998 | Brune et al. | |
| D404,436 | S | 1/1999 | McGahn et al. | |
| 5,855,515 | A | 1/1999 | Pease et al. | |
| 5,876,284 | A | 3/1999 | Acres et al. | |
| 5,882,261 | A | 3/1999 | Adams | |
| 5,902,184 | A | 5/1999 | Bennett | |
| 5,902,983 | A | 5/1999 | Crevelt et al. | |
| 5,911,418 | A | 6/1999 | Adams | |
| 5,919,088 | A | 7/1999 | Weiss | |
| 5,924,027 | A | 7/1999 | Valentine et al. | |
| 5,924,927 | A | 7/1999 | Matsuura et al. | |
| 5,927,714 | A | 7/1999 | Kaplan | |
| 5,935,000 | A | 8/1999 | Sanchez, III et al. | |
| 5,935,002 | A | 8/1999 | Falciglia | |
| 5,941,772 | A | 8/1999 | Paige | |
| 5,947,820 | A | 9/1999 | Morro et al. | |
| 5,951,012 | A | 9/1999 | Feola | |
| 5,951,397 | A | 9/1999 | Dickinson | |
| 5,976,015 | A | 11/1999 | Seelig et al. | |
| 5,980,384 | A | 11/1999 | Barrie | |
| 5,993,315 | A | 11/1999 | Strider et al. | |
| 5,993,316 | A | 11/1999 | Coyle et al. | |
| 5,997,400 | A | 12/1999 | Seelig et al. | |
| 5,997,401 | A | 12/1999 | Crawford | |
| 6,012,982 | A | 1/2000 | Piechowiak et al. | |
| 6,012,983 | A | 1/2000 | Walker et al. | |
| 6,019,369 | A | 2/2000 | Nakagawa et al. | |
| 6,019,374 | A | 2/2000 | Breeding | |
| 6,033,307 | A | 3/2000 | Vancura | |
| 6,039,648 | A | 3/2000 | Guinn et al. | |
| 6,048,269 | A | 4/2000 | Burns et al. | |
| 6,050,895 | A | 4/2000 | Luciano, Jr. et al. | |
| 6,059,289 | A | 5/2000 | Vancura | |
| 6,059,658 | A | 5/2000 | Mangano et al. | |
| 6,077,162 | A | 6/2000 | Weiss | |
| 6,082,887 | A | 7/2000 | Feuer et al. | |
| 6,089,975 | A | 7/2000 | Dunn | |
| 6,089,976 | A | 7/2000 | Schneider et al. | |
| 6,089,978 | A | 7/2000 | Adams | |
| 6,089,980 | A | 7/2000 | Gauselmann | |
| 6,093,102 | A | 7/2000 | Bennett | |
| 6,102,400 | A | 8/2000 | Scott et al. | |
| 6,102,798 | A | 8/2000 | Bennett | |
| 6,110,043 | A * | 8/2000 | Olsen | 463/27 |
| 6,113,098 | A | 9/2000 | Adams | |
| 6,120,377 | A | 9/2000 | McGinnis, Sr. et al. | |
| 6,120,378 | A | 9/2000 | Moody et al. | |
| 6,123,335 | A | 9/2000 | Adkins | |
| 6,126,542 | A | 10/2000 | Fier | |
| 6,128,550 | A | 10/2000 | Heidel et al. | |
| 6,135,884 | A | 10/2000 | Hedrick et al. | |
| 6,135,885 | A | 10/2000 | Lermusiaux | |
| 6,142,872 | A | 11/2000 | Walker et al. | |
| 6,146,273 | A | 11/2000 | Olsen | |
| 6,159,095 | A | 12/2000 | Frohm et al. | |
| 6,159,097 | A | 12/2000 | Gura | |
| 6,165,071 | A | 12/2000 | Weiss | |
| 6,165,072 | A | 12/2000 | Davis et al. | |
| 6,168,521 | B1 | 1/2001 | Luciano et al. | |
| 6,168,523 | B1 | 1/2001 | Piechowiak et al. | |
| 6,186,893 | B1 | 2/2001 | Walker et al. | |
| 6,186,894 | B1 | 2/2001 | Mayeroff | |
| 6,190,055 | B1 | 2/2001 | Andersen | |
| 6,190,255 | B1 | 2/2001 | Thomas et al. | |
| 6,203,010 | B1 | 3/2001 | Jorasch et al. | |
| 6,203,429 | B1 | 3/2001 | Demar et al. | |
| 6,206,782 | B1 | 3/2001 | Walker et al. | |
| 6,210,275 | B1 * | 4/2001 | Olsen | 463/16 |
| 6,210,277 | B1 | 4/2001 | Stefan | |
| 6,213,876 | B1 | 4/2001 | Moore, Jr. | |
| 6,217,448 | B1 * | 4/2001 | Olsen | 463/25 |
| 6,224,482 | B1 | 5/2001 | Bennett | |
| 6,224,483 | B1 | 5/2001 | Mayeroff | |
| 6,224,484 | B1 | 5/2001 | Okuda et al. | |
| 6,224,486 | B1 | 5/2001 | Walker et al. | |
| 6,231,442 | B1 | 5/2001 | Mayeroff | |
| 6,231,445 | B1 | 5/2001 | Acres | |
| 6,238,287 | B1 | 5/2001 | Komori et al. | |
| 6,261,177 | B1 | 7/2001 | Bennett | |
| 6,287,202 | B1 | 9/2001 | Pascal et al. | |
| 6,290,600 | B1 | 9/2001 | Glasson | |
| 6,302,790 | B1 | 10/2001 | Brossard | |
| 6,309,299 | B1 | 10/2001 | Weiss | |
| 6,309,307 | B1 | 10/2001 | Krause et al. | |
| 6,312,332 | B1 | 11/2001 | Walker et al. | |
| 6,315,660 | B1 | 11/2001 | DeMar et al. | |
| 6,338,678 | B1 | 1/2002 | Seelig et al. | |
| 6,375,567 | B1 | 4/2002 | Acres | |
| 6,386,974 | B1 | 5/2002 | Adams | |
| 6,406,369 | B1 * | 6/2002 | Baerlocher et al. | 463/20 |
| 6,461,241 | B1 | 10/2002 | Webb et al. | |
| 6,508,709 | B1 | 1/2003 | Karmarkar | |
| 6,644,664 | B2 | 11/2003 | Muir et al. | |
| 6,645,071 | B2 | 11/2003 | Perrie et al. | |
| 6,652,378 | B2 | 11/2003 | Cannon et al. | |
| 6,656,048 | B2 * | 12/2003 | Olsen | 463/25 |

| | | | | |
|---|---|---|---|---|
| 6,688,975 | B2 | 2/2004 | Baerlocher et al. | |
| 6,688,977 | B1 | 2/2004 | Baerlocher et al. | |
| 6,722,976 | B2 | 4/2004 | Adams | |
| 6,722,983 | B2 | 4/2004 | Kaminkow et al. | |
| 6,726,565 | B2 | 4/2004 | Hughs-Baird | |
| 6,796,899 | B2 | 9/2004 | Baerlocher | |
| 6,800,026 | B2 | 10/2004 | Cannon | |
| 6,837,793 | B2 | 1/2005 | McClintic | |
| 6,860,810 | B2 * | 3/2005 | Cannon et al. | 463/20 |
| 6,866,584 | B2 | 3/2005 | Michaelson | |
| 6,869,361 | B2 * | 3/2005 | Sharpless et al. | 463/25 |
| 6,939,224 | B2 | 9/2005 | Palmer et al. | |
| 6,966,834 | B1 | 11/2005 | Johnson | |
| 6,988,946 | B2 | 1/2006 | Michaelson | |
| 6,988,948 | B2 | 1/2006 | Perrie et al. | |
| 7,029,395 | B1 | 4/2006 | Baerlocher | |
| 7,169,041 | B2 * | 1/2007 | Tessmer et al. | 463/16 |
| 7,192,348 | B2 | 3/2007 | Brosnan | |
| 7,291,069 | B2 | 11/2007 | Michaelson et al. | |
| 7,314,408 | B2 * | 1/2008 | Cannon | 463/16 |
| 7,666,088 | B2 * | 2/2010 | Cannon | 463/25 |
| 7,689,302 | B2 * | 3/2010 | Schlottmann et al. | 700/91 |
| 7,753,784 | B2 * | 7/2010 | Baerlocher | 463/28 |
| 7,787,972 | B2 * | 8/2010 | Schlottmann et al. | 700/91 |
| 7,789,755 | B2 * | 9/2010 | Davis et al. | 463/26 |
| 7,824,267 | B2 * | 11/2010 | Cannon et al. | 463/42 |
| 7,841,939 | B2 * | 11/2010 | Baerlocher et al. | 463/25 |
| 7,854,654 | B2 * | 12/2010 | Baerlocher et al. | 463/27 |
| 7,857,699 | B2 * | 12/2010 | Baerlocher | 463/27 |
| 7,871,323 | B2 * | 1/2011 | Walker et al. | 463/16 |
| 7,874,915 | B2 * | 1/2011 | Caspers et al. | 463/27 |
| 7,883,406 | B2 * | 2/2011 | Vancura | 463/20 |
| 7,892,088 | B2 * | 2/2011 | Brandstetter et al. | 463/25 |
| 7,892,093 | B2 * | 2/2011 | Kniesteadt et al. | 463/25 |
| 7,914,372 | B2 * | 3/2011 | Tessmer et al. | 463/20 |
| 7,963,847 | B2 * | 6/2011 | Baerlocher | 463/27 |
| 7,976,389 | B2 * | 7/2011 | Cannon et al. | 463/42 |
| 7,980,954 | B2 * | 7/2011 | Gagner et al. | 463/42 |
| 7,985,128 | B2 * | 7/2011 | Fong | 463/16 |
| 2001/0004607 | A1 * | 6/2001 | Olsen | 463/26 |
| 2001/0016513 | A1 | 8/2001 | Muir et al. | |
| 2002/0016200 | A1 | 2/2002 | Baerlocher et al. | |
| 2002/0025845 | A1 * | 2/2002 | Cannon | 463/16 |
| 2002/0039923 | A1 | 4/2002 | Cannon et al. | |
| 2002/0128055 | A1 | 9/2002 | Adams | |
| 2002/0177483 | A1 | 11/2002 | Cannon | |
| 2003/0060264 | A1 | 3/2003 | Chilton et al. | |
| 2003/0078091 | A1 | 4/2003 | Brandstetter et al. | |
| 2003/0100361 | A1 * | 5/2003 | Sharpless et al. | 463/25 |
| 2003/0104853 | A1 | 6/2003 | Tessmer et al. | |
| 2003/0104854 | A1 * | 6/2003 | Cannon | 463/16 |
| 2003/0104860 | A1 * | 6/2003 | Cannon et al. | 463/25 |
| 2003/0114218 | A1 * | 6/2003 | McClintic | 463/25 |
| 2003/0114219 | A1 * | 6/2003 | McClintic | 463/25 |
| 2003/0114220 | A1 * | 6/2003 | McClintic | 463/25 |
| 2003/0119581 | A1 * | 6/2003 | Cannon et al. | 463/25 |
| 2003/0125103 | A1 * | 7/2003 | Tessmer et al. | 463/20 |
| 2003/0125107 | A1 * | 7/2003 | Cannon | 463/25 |
| 2003/0126103 | A1 | 7/2003 | Chen et al. | |
| 2003/0127793 | A1 | 7/2003 | Adams | |
| 2003/0236110 | A1 * | 12/2003 | Beaulieu et al. | 463/1 |
| 2004/0102243 | A1 * | 5/2004 | Olsen | 463/25 |
| 2004/0111358 | A1 | 6/2004 | Lange et al. | |
| 2004/0166923 | A1 | 8/2004 | Michaelson et al. | |
| 2004/0224770 | A1 | 11/2004 | Wolf et al. | |
| 2004/0229671 | A1 | 11/2004 | Stronach et al. | |
| 2005/0020340 | A1 * | 1/2005 | Cannon | 463/16 |
| 2005/0096114 | A1 * | 5/2005 | Cannon et al. | 463/16 |
| 2006/0035696 | A1 | 2/2006 | Walker et al. | |
| 2006/0040732 | A1 | 2/2006 | Baerlocher et al. | |
| 2006/0068893 | A1 | 3/2006 | Jaffe et al. | |
| 2006/0119034 | A1 * | 6/2006 | Bozeman | 273/138.1 |
| 2007/0054733 | A1 | 3/2007 | Baerlocher | |
| 2007/0117608 | A1 | 5/2007 | Roper et al. | |
| 2007/0155485 | A1 | 7/2007 | Cuddy et al. | |
| 2007/0265060 | A1 | 11/2007 | Hornik et al. | |

FOREIGN PATENT DOCUMENTS

| | | |
|---|---|---|
| DE | 222436 | 1/1925 |
| DE | 2938307 | 4/1981 |
| DE | 3700861 | 7/1988 |
| DE | 4014477 | 7/1991 |
| EP | 0333338 | 9/1989 |
| EP | 0449433 | 10/1991 |
| EP | 0464935 | 1/1992 |
| EP | 1 063 622 | 12/2000 |
| FR | 1474617 | 2/1967 |
| GB | 1242298 | 8/1971 |
| GB | 2066991 | 7/1981 |
| GB | 2072395 | 9/1981 |
| GB | 2083936 | 3/1982 |
| GB | 2084371 | 4/1982 |
| GB | 2096376 | 10/1982 |
| GB | 2137392 | 10/1984 |
| GB | 2153572 | 8/1985 |
| GB | 2161008 | 1/1986 |
| GB | 2170938 | 8/1986 |
| GB | 2182186 | 5/1987 |
| GB | 2191030 | 12/1987 |
| GB | 2201821 | 9/1988 |
| GB | 2202984 | 10/1988 |
| GB | 2226436 | 6/1990 |
| GB | 2242300 | 9/1991 |
| JP | 5131044 | 5/1993 |
| JP | 2002292022 | 10/2002 |
| WO | WO 98/00210 | 1/1998 |
| WO | WO 00/12186 | 3/2000 |
| WO | WO 00/20082 | 4/2000 |
| WO | 0227676 | 4/2002 |
| WO | 2002/094399 | 11/2002 |
| WO | WO 02/096528 | 12/2002 |
| WO | 03026757 | 4/2003 |
| WO | WO 03/026757 | 4/2003 |
| WO | WO 03/083796 | 10/2003 |

OTHER PUBLICATIONS

Bingo Game Brochure published by Casino Data Systems in 1998.
Bueschel, Richard M., "An Illustrated Price Guide to the 100 Most Collectible Trade Stimulators," 1978, pp. 21, 29, 83.
Bueschel, Richard M., "Slots 1," 1978, pp. 136, 142.
EZ-Pay Ticket System Brochures, IGT (2000).
Fey, Marshall, "Slot Machines," 1983, p. 126, 150.
Full House Brochure published by Anchor Games in 2000.
Geddes, Ribert N., "Slot Machines on Parade," Oct. 1980, p. 128.
IGT Gaming System Brochures, IGT (at least 2001).
Instant Slotto, Strictly Slots (Apr. 2001).
Intergame Magazine, Jun. 1995, cover and pp. 91, 101.
International Preliminary Report on Patentability corresponding to International Application U.S. Application Serial No. PCT/US2004/022421, International Bureau of WIPO, dated Feb. 6, 2006, 9 pages.
International Search Report for Application No. PCT/US2004/022421 dated Dec. 3, 2004.
Jackpot Bingo published by CDS.com printed on Apr. 12, 2001.
Jewel in the Crown Brochure published by Barcrest, Ltd., available prior to Jul. 23, 2003.
Jewel in the Crown Brochure published by IGT in 1999.
Match Reel Game Bonus Description published by IGT, available prior to Jul. 23, 2003.
Raining Diamonds Advertisement, Sierra Design Group (2001).
Scarne, Scarne's New Complete Guide to Gambling, Slmon & Schuster, pp. 162-167 (1974).
Silver Strike Advertisement and Pictures, Anchor Gaming (1997).
Take Your Pick, Strictly Slots (Mar. 2001).
Written Opinion for Application No. PCT/US2004/022421 dated Dec. 3, 2004.
Statement of Ground and Particulars for Australian Patent Application No. 2004260440.

* cited by examiner

METHODS AND APPARATUS FOR A COMPETITIVE BONUS GAME WITH VARIABLE ODDS

PRIORITY CLAIM

This application is a continuation of, claims the benefit of and priority to U.S. patent application Ser. No. 10/625,397, filed Jul. 23, 2003, the entire contents of which is incorporated herein by reference.

BACKGROUND

Gaming establishments are continually searching for new gaming systems to hold the attention of players. By developing new games, the gaming establishments hope to pique existing players' interests in continued wagering and to attract new players. If players lose interest in a gaming unit, they typically will stop playing that game, which causes the gaming unit to be idle and not contribute to the revenue of the casino. In addition, interested players may tend to be more active and consistent in the play of their respective units and consequently tend to play faster, thus enhancing the potential profit of the unit.

To keep and increase players' interest in gaming, the gaming industry has added bonus games to many of its games, including, for example, mechanically rotatable reel and video slot machines. A bonus game is typically a secondary game that is activated when a specific outcome occurs in a primary or standard game. For instance, the bonus game may be triggered or activated when the player receives an icon, or indicia in the case of a slot game, while the primary game is being played. Bonus games appeal to players because the probability of winning combinations after entry into the bonus game is, at least, greatly enhanced and, in most instances some sort of winning outcome is guaranteed.

A bonus game is typically a different type of game than the primary game. This provides more variety and excitement for a player and helps to keep the player at the gaming unit for a longer period of time. However, the bonus game may also be the same type of game as the primary game, except that the bonus game may have an increased potential for winning in comparison to the primary game.

In many cases, the bonus game is a singular event in that the play changes to the bonus game when a specific outcome occurs in the primary game. Thereafter, the bonus game is played to completion. When the bonus game is completed, the amount of the bonus payout is indicated. In these bonus games, the players are playing against the house and not playing against one another.

While the above-mentioned bonus games have been used in the gaming industry, improved gaming systems and methods are still needed to pique and maintain players' interests in gaming. Preferably, these improved gaming systems and methods would appeal to the players' competitive nature, introduced now with games of chance, and provide the potential for larger payoffs in comparison to the payoffs in the primary game and in other bonus games.

SUMMARY OF THE INVENTION

In one aspect, the invention is directed to a gaming system for playing a competitive bonus game, where the game comprises a first gaming apparatus having a game display unit, a value input device, and a controller operatively coupled to the game display unit and the value input device, the controller comprising a processor and a memory operatively coupled to the processor. The controller being programmed to cause the game display unit to generate a game display relating to one of the following games: poker, blackjack, slots, keno or bingo. The controller also being programmed to determine a value payout associated with an outcome of the game.

The gaming system also includes a second gaming apparatus operatively coupled to the first gaming apparatus and a bonus controller operatively coupled to the first and second gaming apparatuses. The bonus controller comprises a processor and a memory operatively coupled to the processor of the bonus controller. The bonus controller being programmed to receive wagering data from the first and second gaming apparatuses, and to enter a first player at the first gaming apparatus into the competitive bonus game when the first player obtains a qualifying win at one of the games generated by the game display unit of the first gaming apparatus.

The bonus controller also being programmed to determine odds for the first player to win the competitive bonus game, and to vary odds of winning the competitive bonus game for at least a second player after entering the first player into the competitive bonus game, the second player having been previously entered into the competitive bonus game. The bonus controller being further programmed to determine an outcome of the competitive bonus game, and to transmit data corresponding to the outcome of the competitive bonus game to the first and second gaming apparatuses.

In another aspect, the invention is directed to a bonus controller for generating a competitive bonus game in a gaming system, the bonus controller comprising: a processor and a memory operatively coupled to the processor. The bonus controller being programmed to receive wagering data corresponding to a game selected from one of the following games: poker, blackjack, slots, keno or bingo, enter a first player associated with a first gaming apparatus into the competitive bonus game when the first player obtains a qualifying win at one of the games, and determine odds for the first player to win the competitive bonus game.

The bonus controller being further programmed to vary odds of winning the competitive bonus game for at least a second player after entering the first player into the competitive bonus game, the second player having been previously entered into the competitive bonus game, determine an outcome of the competitive bonus game, and transmit data corresponding to the outcome of the competitive bonus game.

In yet another aspect, the invention is directed to a gaming method, comprising causing a game display of one of the following games to be generated on a display unit of a first gaming apparatus: poker, blackjack, slots, keno or bingo; causing a game display of one of the following games to be generated on a display unit of a second gaming apparatus: poker, blackjack, slots, keno or bingo; and determining an outcome of the game represented by the game display generated on the display unit of the first gaming apparatus.

The method also comprises transmitting wagering data from the first gaming apparatus to the bonus controller; determining if the outcome is a qualifying outcome for a competitive bonus game; qualifying a first player at the first gaming apparatus for the competitive bonus game if the outcome is a qualifying outcome; and varying odds of winning the competitive bonus game for the first player and at least a second player after qualifying the first player for the competitive bonus game, the second player having been previously qualified for the competitive bonus game. The method also includes initiating the competitive bonus game; transmitting display data associated with the competitive bonus game from the bonus controller to a display unit; and determining a value payout associated with a bonus outcome of the competitive bonus game.

In another aspect, the invention is directed to a memory having a computer program stored therein, the computer program being capable of being used in connection with a bonus controller in a gaming system, the memory comprising: a memory portion physically configured in accordance with computer program instructions that would cause the bonus controller to receive wagering data corresponding to a game, the game selected from one of the following games: poker, blackjack, slots, keno or bingo, and a memory portion physically configured in accordance with computer program instructions that would cause the bonus controller to enter a first player into the competitive bonus game when the first player obtains a qualifying win at one of the games corresponding to the wagering data.

The memory further comprising a memory portion physically configured in accordance with computer program instructions that would cause the bonus controller to determine odds for the first player to win the competitive bonus game; and a memory portion physically configured in accordance with computer program instructions that would cause the bonus controller to vary odds of winning the competitive bonus game for at least a second player after entering the first player into the competitive bonus game, the second player having been previously entered into the competitive bonus game. Also included is a memory portion physically configured in accordance with computer program instructions that would cause the bonus controller to determine an outcome of the competitive bonus game and a memory portion physically configured in accordance with computer program instructions that would cause the bonus controller to transmit data corresponding to the outcome of the competitive bonus game to a display unit.

Additional aspects of the invention are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
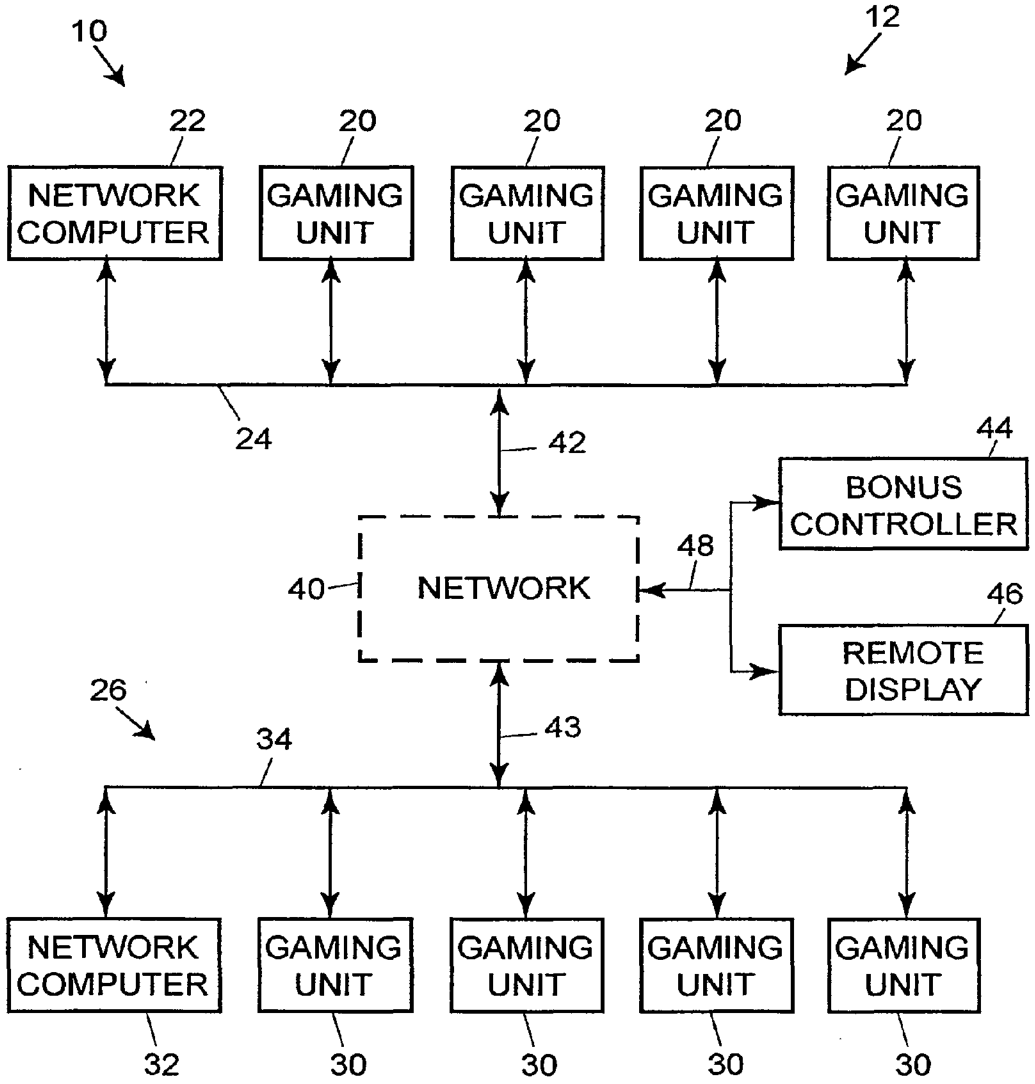
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 43.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 43 via an Internet communication protocol.

The network computer 22 may be a server computer and may be used to accumulate and analyze wagering data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, it should be understood that different numbers of computers and gaming units may be utilized. For example, the network 12 may include a plurality of network computers 22 and tens or hundreds of gaming units 20, all of which may be interconnected via the data link 24. The data link 24 may be provided as a dedicated hardwired link or a wireless link. Although the data link 24 is shown as a single data link 24, the data link 24 may comprise multiple data links.

A bonus controller 44 and a remote display 46 may also be coupled to the network 40 via a third network link 48. The bonus controller 44 may be used to receive and transmit data to the gaming units 20, the network computers 22, 32, and the remote display 46. The bonus controller may also be used to control the operation of a competitive bonus game for players at the gaming units 20.

Those of ordinary skill in the art will appreciate that the bonus controller 44 may be operatively coupled directly to the network computer 22, 32 or incorporated within the network computer 22, 32. Similarly, the bonus controller 44 may be operatively coupled directly to one of the gaming units 20 or incorporated within one of the gaming units 20. Those of ordinary skill in the art will appreciate that the functions of the bonus controller 44 may alternatively be performed by the network computer 22, 32 or one of the gaming units 20. For example, there could be a master-slave relationship where one of the gaming units 20 also serves as the bonus controller and the other gaming units may or may not participate in the bonus controlling functionality. As an alternative example, a peer-to-peer relationship could be utilized where each of the gaming units 20 performs equivalent bonus controller implementation with the necessary data communicated between the gaming units 20.

The remote display 46 may be either an electronic or mechanical device, or a combination of both. The remote display 46 may be used to display any number of aspects of a competitive bonus game to the players at the gaming units 20. It should also be noted that the remote display may be eliminated by utilizing the individual gaming units 20 to display characteristics and data corresponding to the competitive bonus game.

The remote display 46 may, for example, be configured as a relatively large liquid crystal display ("LCD") screen, or a plurality of such screens. The remote display may be relatively large in comparison to the display units 70 on the gaming units 20. The remote display 46 may be positioned in an area above the gaming units 20 or the gaming units 30 so that the remote display 46 is visible to all players at the gaming units 20 or the gaming units 30. The remote display 46 may comprise other types of display screens known in the art, including cathode-ray two (CRT) screens, plasma display screens, and/or screens based on light-emitting diode (LED) technology. The remote display 46 may be a display screen configured for multiple uses and concurrent display of other casino-sponsored information. For example, the remote display 46 may be used in association with a Sports Book venue of the casino during periods in which the remote display 46 is temporarily not used for the purpose of displaying aspects of the competitive bonus game. If the remote display 46 is an electromechanical device, the device may be positioned in the establishment to be visible to all players at the gaming machines 20 or the gaming machines 30.

Figure 2:
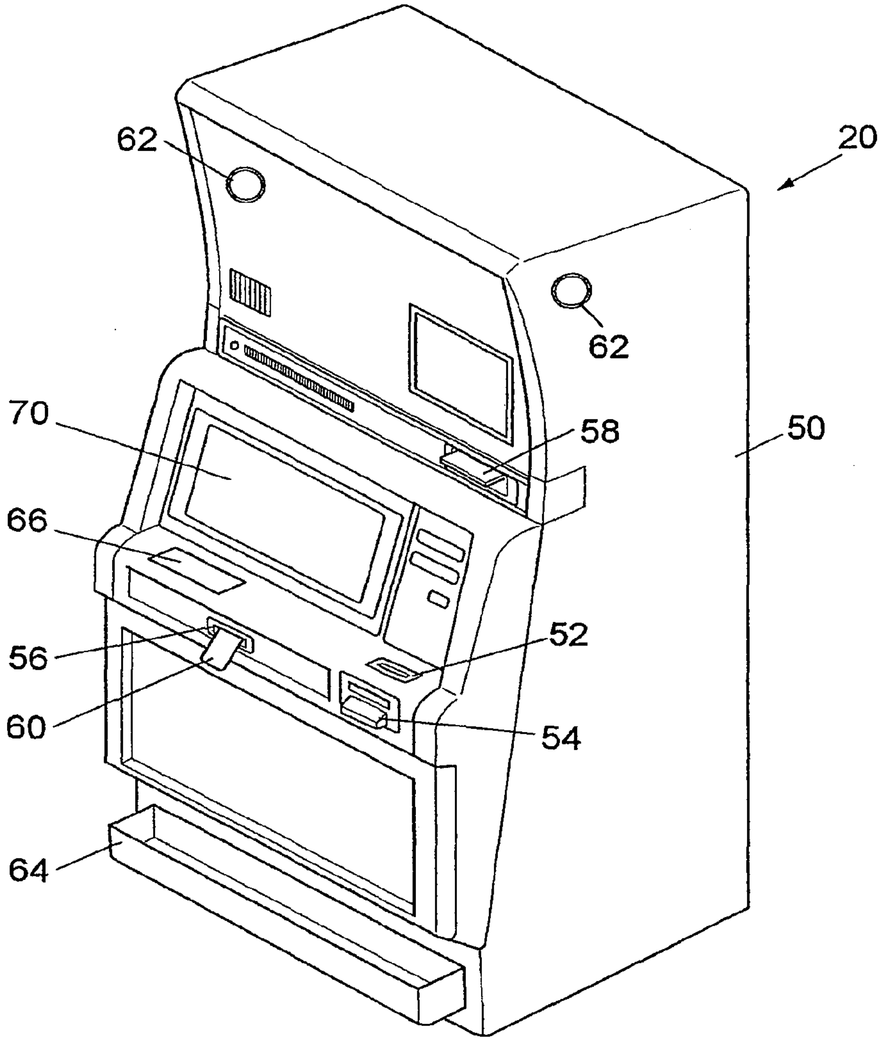
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a display unit 70. Where the gaming unit 20 is designed to facilitate play of a video casino game, such as video poker or video slots, the display unit 70 may be a color video display unit that displays images relating to the particular game or games. Where the gaming unit 20 is designed to facilitate play of a reel-type slot machine, the display unit 70 may comprise a plurality of mechanical reels that are rotatable, with each of the reels having a plurality of reel images disposed thereon. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
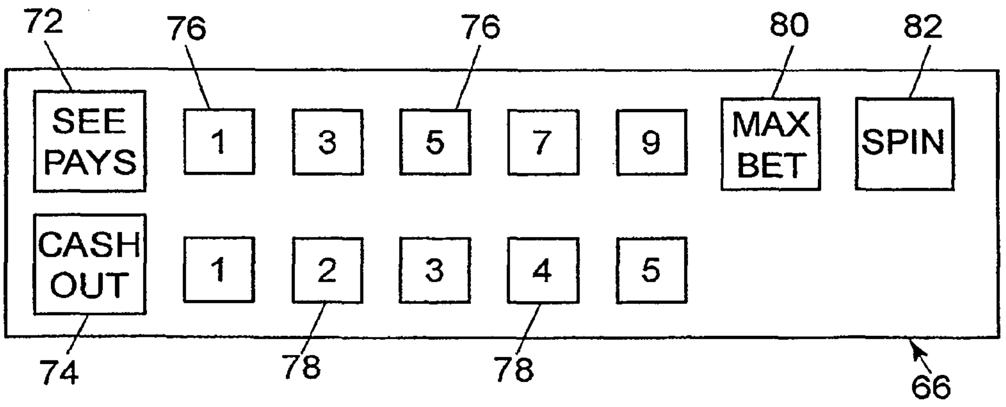
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, if the display unit 70 is provided in the form of a video display unit, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. If the display unit 70 is provided as a video display unit, the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
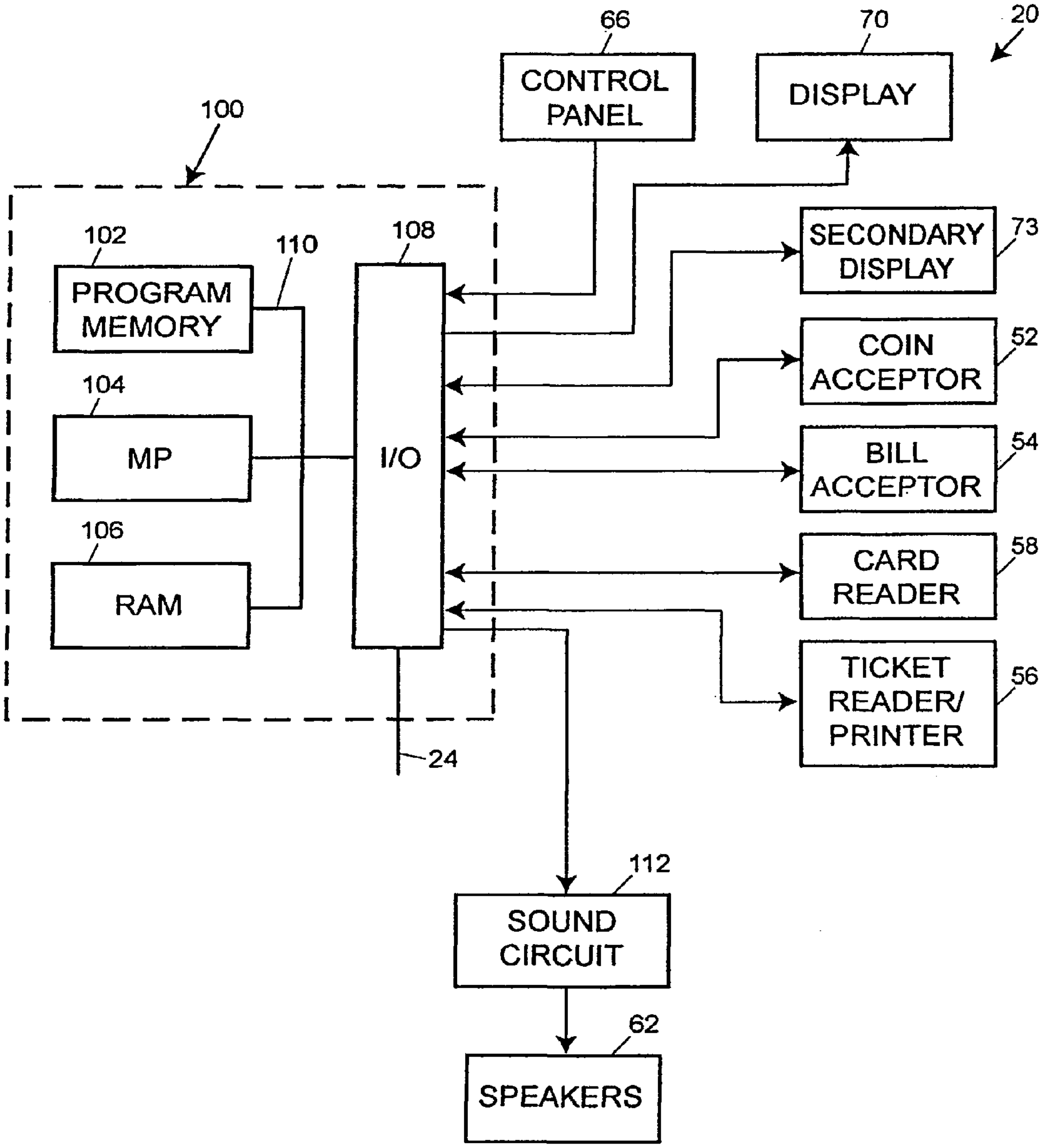
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Figure 4:
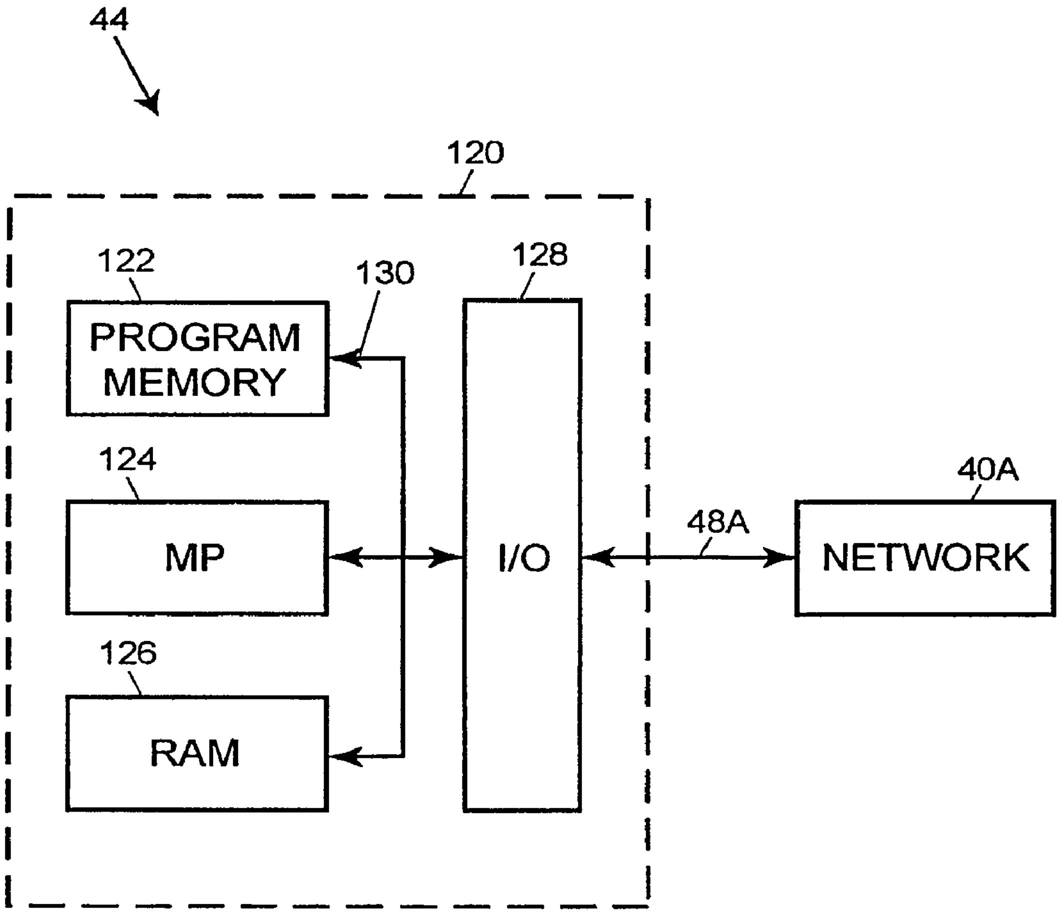
FIG. 4 is a block diagram of the electronic components of the bonus controller of FIG. 1.

FIG. 4 is a block diagram of a number of components that may be incorporated in the bonus controller 44. Referring to FIG. 4, the bonus controller 44 may include a controller 120 that may comprise a program memory 122, a microcontroller or microprocessor (MP) 124, a random-access memory (RAM) 126 and an input/output (I/O) circuit 128, all of which may be interconnected via an address/data bus 130. As with the controller 100, it should be appreciated that although only one microprocessor 124 is shown, the controller 120 may include multiple microprocessors 124. Similarly, the memory of the controller 120 may include multiple RAMs 126 and multiple program memories 122. Although the I/O circuit 128 is shown as a single block, it should be appreciated that the I/O circuit 128 may include a number of different types of I/O circuits. The RAM(s) 124 and program memories 122 may be implemented as semiconductor memories, magnetically readable memories, and/or optically readable memories, for example.

Although the program memory 122 is shown in FIG. 4 as a read-only memory (ROM) 122, the program memory of the controller 120 may be a read/write or alterable memory, such as a hard disk. In the event a hard disk is used as a program memory, the address/data bus 130 shown schematically in FIG. 4 may comprise multiple address/data buses, which may be of different types, and there may be an I/O circuit disposed between the address/data buses. Furthermore, the controller 120 is operatively coupled to the network 40A via the link 48A.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

It should be noted that the present patent relates to gaming methods and systems where a competitive bonus game is linked to play of primary games at the individual gaming units 20. The bonus game is competitive in that multiple players may qualify to compete in or play the bonus game. The bonus game is described in detail with reference to FIGS. 7-14. However, before describing the competitive bonus game in detail, a basic overview of a player's gaming experience playing a primary game and then potentially the competitive bonus game will be described below with reference to FIGS. 5 and 6.

Figure 5:
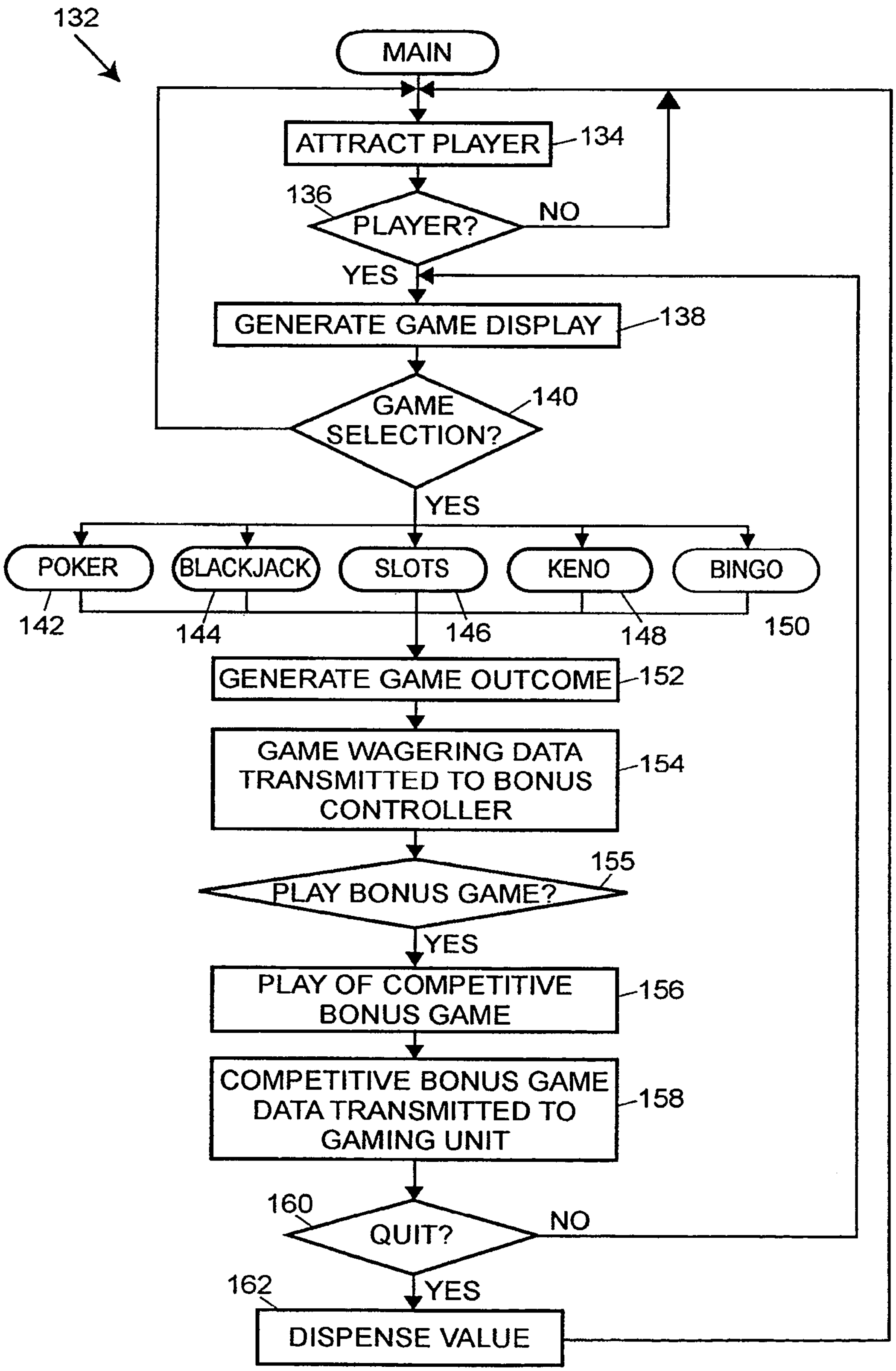
FIG. 5 is a flowchart of an embodiment of a main routine that may be performed during operation of one or more gaming units.

FIG. 5 is a flowchart of a main operating routine 132 that may be stored in the memory of the controller 100. Referring to FIG. 5, the main routine 132 may begin operation at block 134 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62. The attraction sequence may include a scrolling list of primary (i.e. first) games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 136, the attraction sequence may be terminated and a game-selection display may be generated on the display unit 70 (if provided as a video display unit) at block 138 to allow the player to select a game available on the gaming unit 20. The gaming unit 20 may detect an input at block 136 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 138 may include, for example, a list of primary video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 140, the controller 100 may cause one of a number of primary game routines to be performed to allow the selected game to be played. For example, the primary game routines could include a video poker routine 142, a video blackjack routine 144, a slots routine 146, a video keno routine 148, and a video bingo routine 150. At block 140, if no game selection is made within a given period of time, the operation may branch back to block 134.

After one of the routines 142, 144, 146, 148, 150 has been performed to allow the player to play one of the primary games, a game outcome may be determined for the game selected and played by the player by the gaming unit 20 at block 152. Wagering data corresponding the game played by the player may then be transmitted to the bonus controller 44 at block 154. The wagering data may include, for example, the identity of the player, the amount wagered during play of the primary game, the duration of play at the primary game, the outcome of the primary game, the total amount wagered at the primary game, etc.

After the wagering data is transmitted to the bonus controller 44, the player may be qualified to enter and play the competitive bonus game at block 156. As mentioned above, embodiments of the competitive bonus game are discussed below with reference to FIGS. 7-14. If the player entered the competitive bonus game, data corresponding to the play and outcome of the competitive bonus game may be transmitted to the gaming unit 20 and possibly the remote display 46 at block 158.

Thereafter, block 160 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 162 based on the outcome of the game(s) played by the player. The operation may then return to block 134. If the player did not wish to quit as determined at block 160, the routine may return to block 138 where the game-selection display may again be generated to allow the player to select another primary game.

It should be noted that although five gaming routines are shown in FIG. 5, a different number of routines could be included to allow play of a different number of primary games. The gaming unit 20 may also be programmed to allow play of different games.

Figure 6:
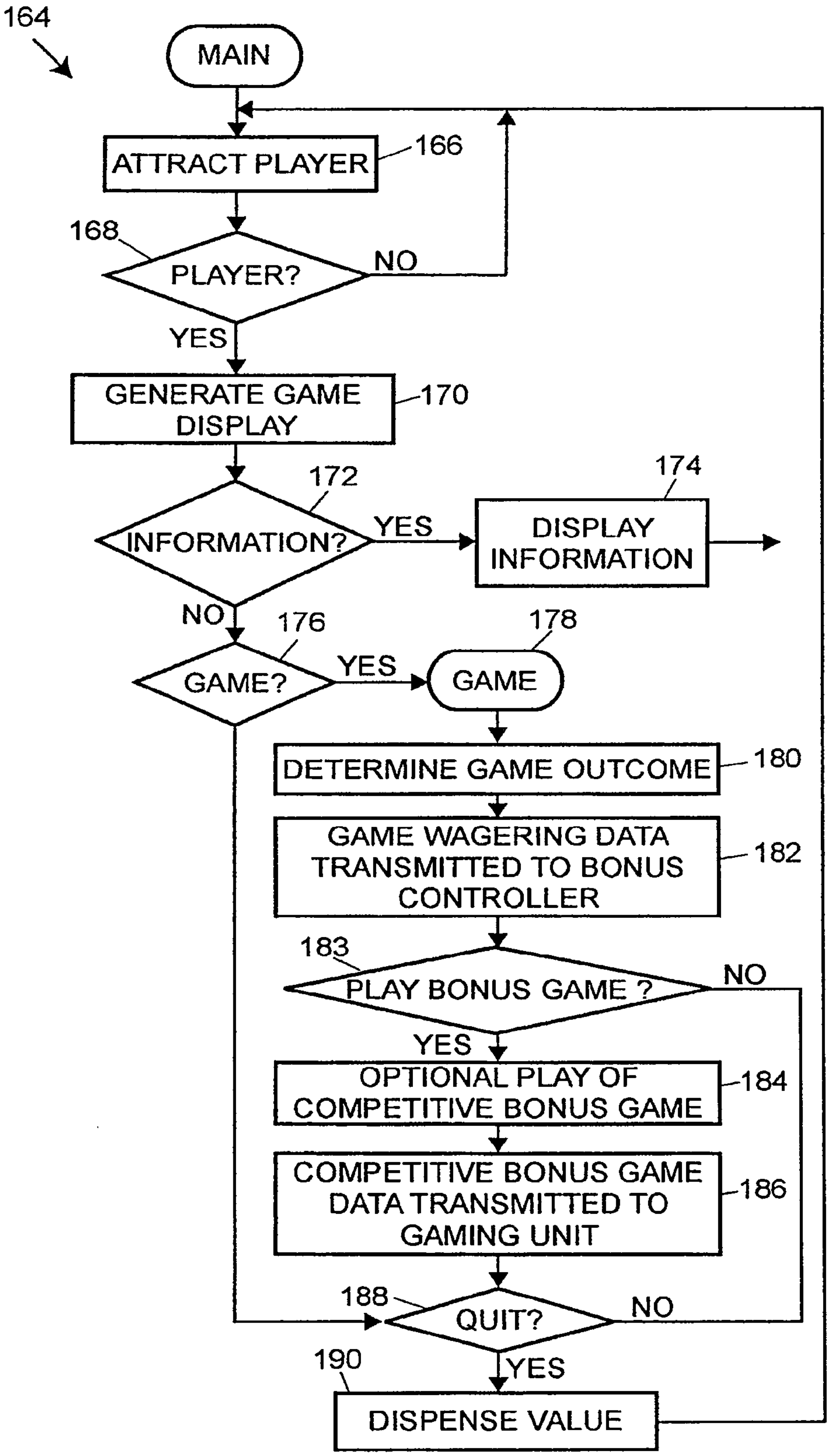
FIG. 6 is a flowchart of an alternative embodiment of a main routine that may be performed during operation of one or more of the gaming units.

FIG. 6 is a flowchart of an alternative main operating routine 164 that may be stored in the memory of the controller 100. The main routine 164 may be utilized for gaming units 20 that are designed to allow play of only a single, primary game or single type of game. Referring to FIG. 6, the main routine 164 may begin operation at block 166 during which an attraction sequence may be performed in an attempt to induce a potential player in a casino to play the gaming unit 20. The attraction sequence may be performed by displaying one or more video images on the display unit 70 (if provided as a. video display unit) and/or causing one or more sound segments, such as voice or music, to be generated via the speakers 62.

During performance of the attraction sequence, if a potential player makes any input to the gaming unit 20 as determined at block 168, the attraction sequence may be terminated and a game display may be generated on the display unit 70 (if provided as a video display unit) at block 170. The game display generated at block 170 may include, for example, an image of the primary, casino game that may be played on the gaming unit 20 and/or a visual message to prompt the player to deposit value into the gaming unit 20. At block 172, the gaming unit 20 may determine if the player requested information concerning the game, in which case the requested information may be displayed at block 174. Block 176 may be used to determine if the player requested initiation of a primary game, in which case a game routine 178 may be performed. The game routine 178 could be any one of the game routines disclosed herein, such as one of the five game routines 142, 144, 146, 148, 150, or another game routine.

After the routine 178 has been performed to allow the player to play the game, a game outcome may be determined for the game played by the player at block 180. Wagering data corresponding the game played by the player may then be transmitted to the bonus controller 44 at block 182. The wagering data may include, for example, data similar to that described in relation to the flowchart of FIG. 5.

After the wagering data is transmitted to the bonus controller 44, the player may be qualified to enter and play the competitive bonus game at block 184. If the player entered the competitive bonus game, data corresponding to the play and outcome of the competitive bonus game may be transmitted to the gaming unit 20 and possibly the remote display 46 at block 186.

Thereafter, block 188 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 190 based on the outcome of the game(s) played by the player. The operation may then return to block 166. If the player did not wish to quit as determined at block 188, the operation may return to block 170.

Competitive Bonus Games

One manner in which the bonus controller 44 may operate is described below in connection with a number of flowcharts which represent a number of portions or routines of one or more computer programs, which may be stored in one or more of the memories of the controller 120. The computer program(s) or portions thereof may be stored remotely, outside of the bonus controller 44, and may control the operation of the bonus controller 44 from a remote location. Such remote control may be facilitated with the use of a wireless connection, or by an Internet interface that connects the bonus controller 44 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 122, 126 are physically and/or structurally configured in accordance with computer program instructions.

Figure 7:
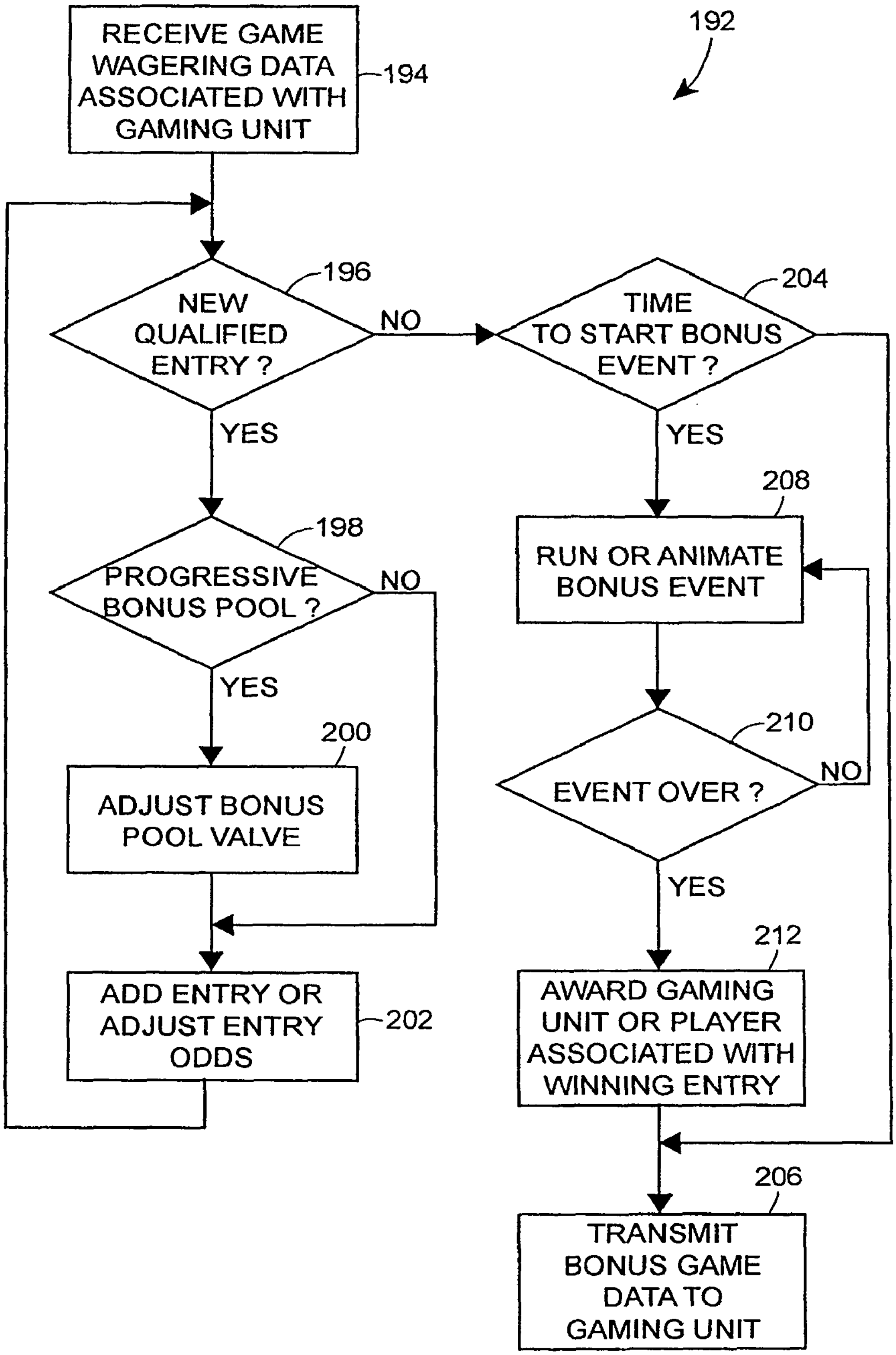
FIG. 7 is a flowchart of an embodiment of a main routine that may be performed during operation of the bonus controller.

FIG. 7 is a flowchart of a main operating routine 9 that may be stored in the memory of the controller 120. Referring to FIG. 7, the main routine 192 may begin operation at block 194 during which the bonus controller obtains wagering data associated with the play of a primary game at one of the gaming units 20. Block 194 corresponds to the blocks 154 and 182 from FIGS. 5 and 6, respectively. After receiving the wagering data from, for example, the gaming unit 20, the bonus controller 44 may analyze the data and determine if the player qualifies to be entered into the competitive bonus game at block 196.

The player of the primary game may qualify for entry into the competitive bonus game when, for example, at least one specific outcome occurs during play of the primary game or by meeting other selected criteria associated with play of the primary game. At least one specific outcome may include the random display of a special symbol or element, referred to as an "event symbol." In a slot machine game, for example, the event symbol may be located on one or more of the rotatable reels of the slot machine. The player may qualify for the competitive bonus game when a specific number of event symbols appear anywhere on the display unit 70 of the gaming unit 20. The player may receive an entry into the competitive bonus game if a specific number of event symbols are present on the payline. In a card game, for example, the event symbol may be a bonus card and the player may qualify for the competitive bonus game by having the bonus card in his or her final hand. In addition, a stronger bonus-triggering outcome in a primary game may lead to bonus game entries with higher odds of winning.

The player's participation in the competitive bonus game may also be related to the amount of his or her wager in the primary game. The player may be required to obtain a predetermined number of bonus credits before qualifying to play in a competitive bonus game. For example, the player may need five bonus credits to play the competitive bonus game. The player may receive one bonus credit by wagering one credit in a round of the primary game in which a qualifying, specific outcome occurs. The at least one specific outcome would then need to occur four more times, with the player wagering one credit each time, for the player to obtain the five bonus credits. However, the player may more quickly obtain the five bonus credits by wagering an increased number of credits in the primary game. For example, if the player wagered five credits in the primary game and the at least one specific outcome occurred, the player would receive five bonus credits and would immediately qualify for entry into the competitive bonus game. Another example of qualifying for the competitive bonus game may include obtaining a plurality of specific outcomes of playing the primary game. Other examples may include playing the primary game for a predetermined number of times or for a predetermined duration of time. Yet another example of qualifying an entry may include playing the primary game for a predetermined plurality of times and wagering a predetermined sum of money over the multiple plays.

If it is determined at block 196 that the entry is qualified for the competitive bonus game, the bonus controller 44 may determine if the competitive bonus game incorporates a progressive bonus pool at block 198. If the competitive bonus game incorporates a progressive bonus pool, a portion of the wager in the primary game that initiated the qualifying entry may be allocated to a bonus award pool at block 200.

After adjusting the bonus pool value at block 200, or after determining that the competitive bonus game did not incorporate a progressive bonus pool at block 198, the bonus controller 44 may add an entry into the competitive bonus game for the player or adjust the entry odds for a previous entry by the player in the competitive bonus game at block 202.

The additional entry or the adjustment of the entry odds on a previous entry may be deferred by the player until the player has accumulated multiple qualifying entries or improved odds of winning with one or more of a player's entries. This may be accomplished by prompting the player with a message asking whether he or she wants to participate in the competitive bonus game immediately or defer. By choosing to defer, the player may receive the opportunity to accumulate multiple entries or increase the weight of one or more of his or her entries in the competitive bonus game, thereby obtaining varied odds of winning the competitive bonus game. The odds may be varied by increasing the odds that an entry will win in the competitive bonus game in comparison to the base-level odds that the entry would win. If the odds that one entry will win are increased, the odds that one or more other entries will win may correspondingly decrease. Accordingly, the odds that an entry into the bonus game will win may be decreased below a base level.

These varied odds may be invisible to the player and the odds may be changed, such as changing the odds without displaying them. However, the varied odds may be visible and displayed on the individual gaming unit 20 or the remote display 46. Depending on the type of competitive bonus game being played, the total number of qualifying entries each player may obtain may be limited.

The player's varied odds may, for example, be increased by allowing the player to accumulate multiple entries into the competitive bonus game. This may be possible in a competitive bonus game where the player of each gaming unit 20 can accumulate more than one entry. If the player has accumulated multiple entries in the competitive bonus game, that player's odds of winning that game will be increased when compared to a player with only one entry. The player's odds may be increased by increasing the weight of the player's entry, which may occur in a competitive bonus game where the number of entries is limited to one entry per player or game unit 20 or situations where all of the available entries into the competitive bonus game have been awarded but play of the competitive bonus game has not yet begun. If one or more of the player's entries have increased entry weights, each such entry may have a higher probability of winning than qualified entries with weights that have not been increased.

A player may be permitted to select between an additional entry into the competitive bonus game and increasing the weight of a previously qualified entry. The weight provided to a competitive bonus game entry or the amount of an increase in the weight (i.e. the varied odds) of a previously qualified entry may relate to the amount that was wagered by the player in the primary game.

As a player's odds of winning the competitive bonus game may increase, it is also contemplated that the odds of winning the competitive bonus game may also decrease. As noted previously herein, a decrease in the odds of that particular entry into a competitive bonus game will win may occur as the odds for winning associated with another entry are increased. The odds that a player will win the competitive bonus game may also be decreased if a different specific outcome occurs during a play of the primary game, which causes a decrease in the player's number of entries or the entry weight of one or more of that player's entries. This feature would provide additional excitement because players who already have qualifying entries may be required to choose whether to continue playing the primary game to obtain more entries. These players would know that even though they may obtain additional entries, they may also lose entries they may have accumulated. The players would have to balance the risk of losing entries against the possibility of obtaining more qualifying entries or improved odds of winning with one or more qualifying entries. It is contemplated that a lower limit may be set so that the player does not lose all of his or her qualifying entries into the competitive bonus game or diminish, below a minimum limit, the odds that a previously obtained entry will win the competitive bonus game.

If the competitive bonus game incorporates a progressive bonus pool, the gaming facility may credit the bonus pool with a fixed bonus amount at the beginning of each competitive bonus game. Thereafter, when a player qualifies for the competitive bonus game, the progressive bonus pool may be credited with a fixed bonus amount, which may be multiplied by the amount that corresponds either proportionately or non-proportionately to the player's wager amount in the primary game. Alternatively, or in addition, an amount may be added to the progressive bonus pool each time a wager is placed as a round of game play ends in the primary game. It should be noted that the competitive bonus game may optionally allow a qualified player to place a wager on the outcome of the competitive bonus game.

Still referring to FIG. 7, after adding the new entry or varying the odds for the player and any other players qualified for the competitive bonus game at block 202, the routine 192 may loop back to block 196. Thereafter, the routine 192 may check again to see if the entry is a new qualified entry, and if it is determined at block 196 that the entry is not new (i.e. already processed) the routine 192 may check to determine if it is time to start the bonus event at block 204. If it is determined at block 204 that it is not time to start the bonus event, the routine 192 may transmit the bonus game data to the gaming unit(s) 20 and/or the remote display 46 at block 206. This bonus game data may include, for example, data corresponding to the number of entries qualified for the competitive bonus game, the amount accumulated in the progressive bonus pool, the odds of a player winning the competitive bonus game, the remaining time before the competitive bonus game will begin, etc. The bonus game data may also include video images corresponding to the play of the competitive bonus game.

If it is determined at block 204 that it is time to start the bonus event, routine 192 may run or animate the bonus event at block 208. The routine 192 may continue running or animating the bonus event until it is determined at block 210 that the competitive bonus event is complete. The routine 192 may then determine a bonus outcome of the competitive bonus game and award the gaming unit 20 or player associated with the winning entry the amount of the bonus outcome at block 212. The awarded bonus outcome may then be transmitted along with other bonus game data to the gaming unit 20 and/or the remote display 46.

Figure 8:
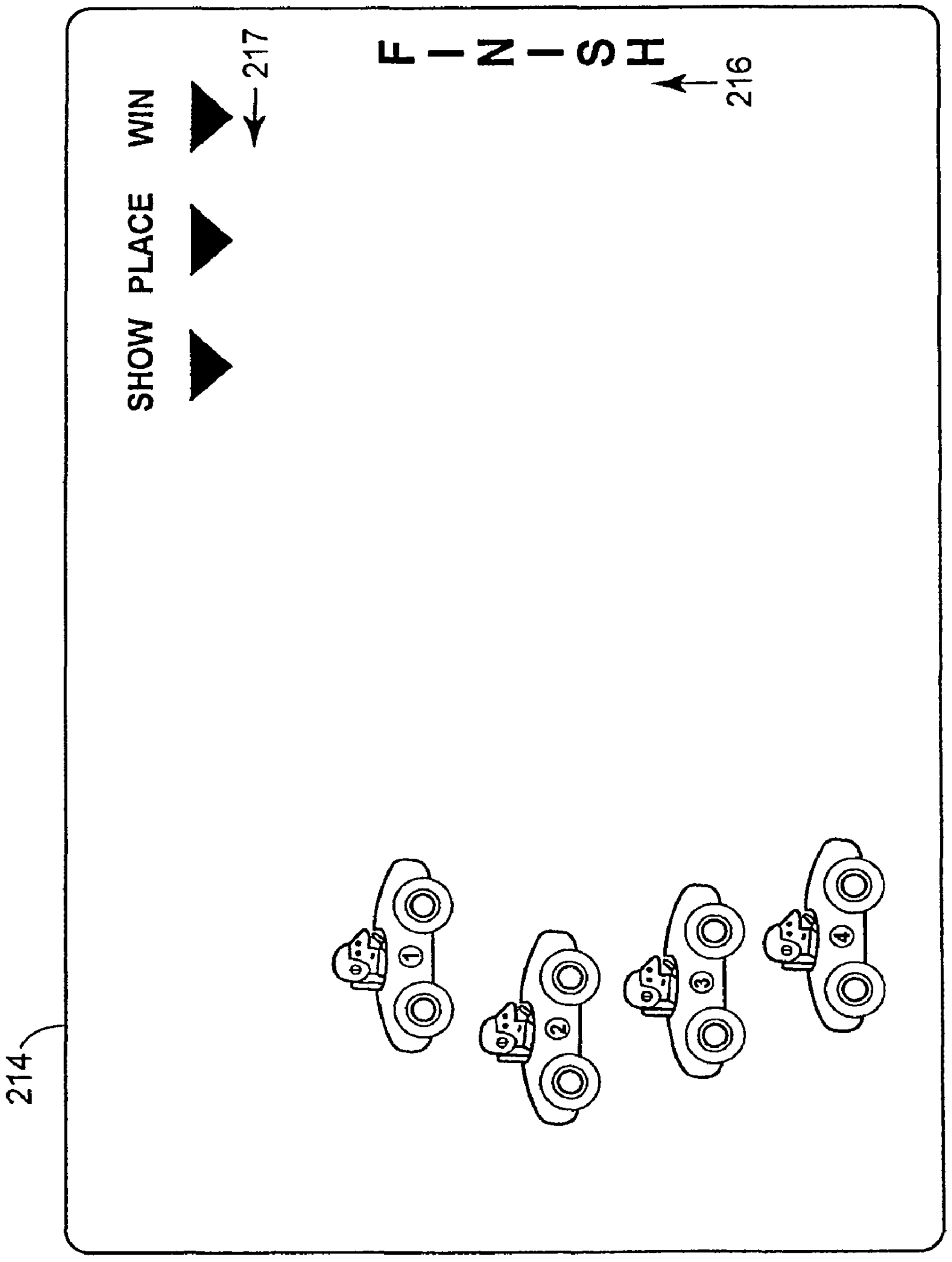
FIG. 8 is an illustration of an embodiment of a visual display that may be displayed during performance of the race-type competitive bonus routine of FIGS. 9 and 10.
Figure 9:
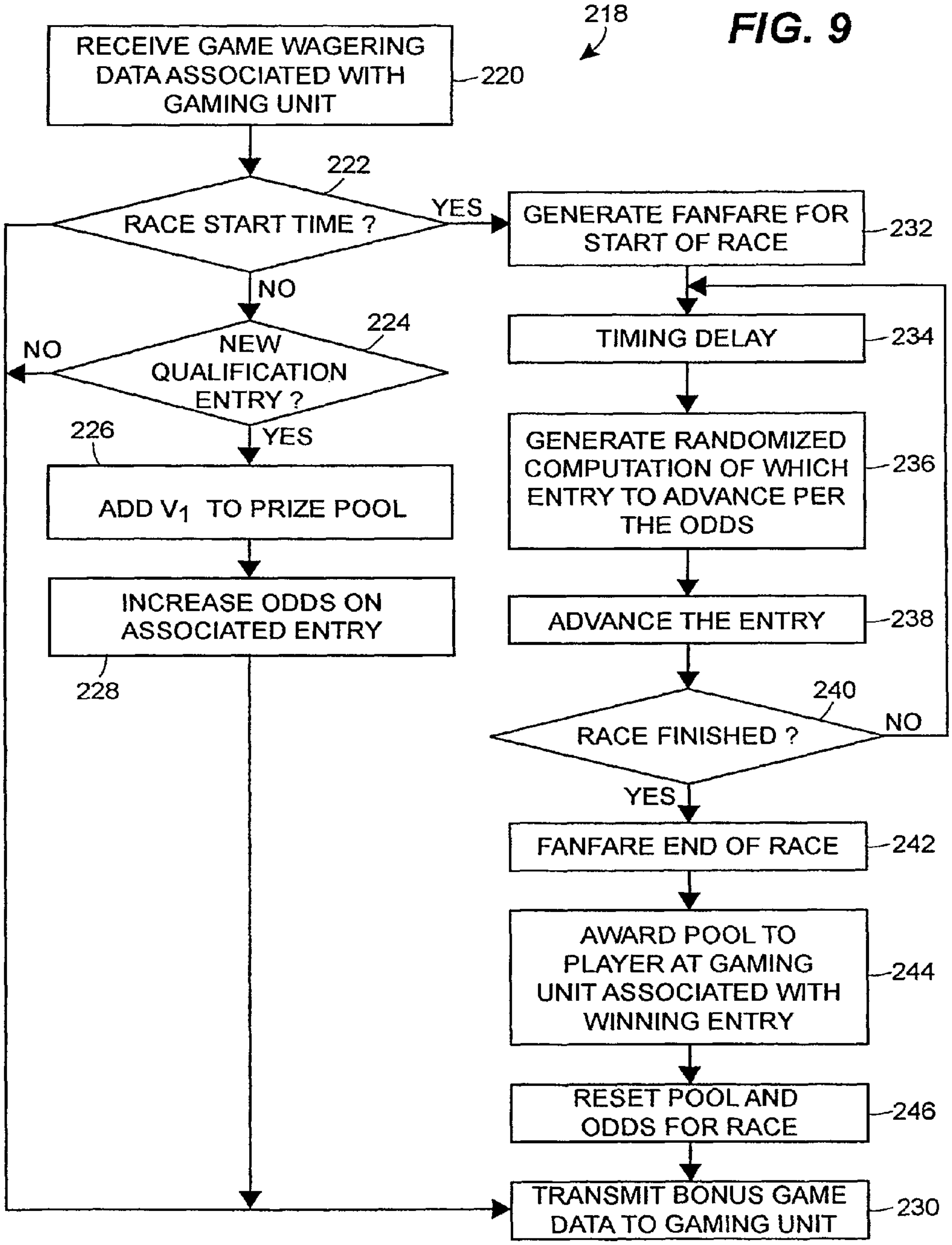
FIG. 9 is a flowchart of an embodiment of a race-type competitive bonus routine that may be performed by the bonus controller.
Figure 10:
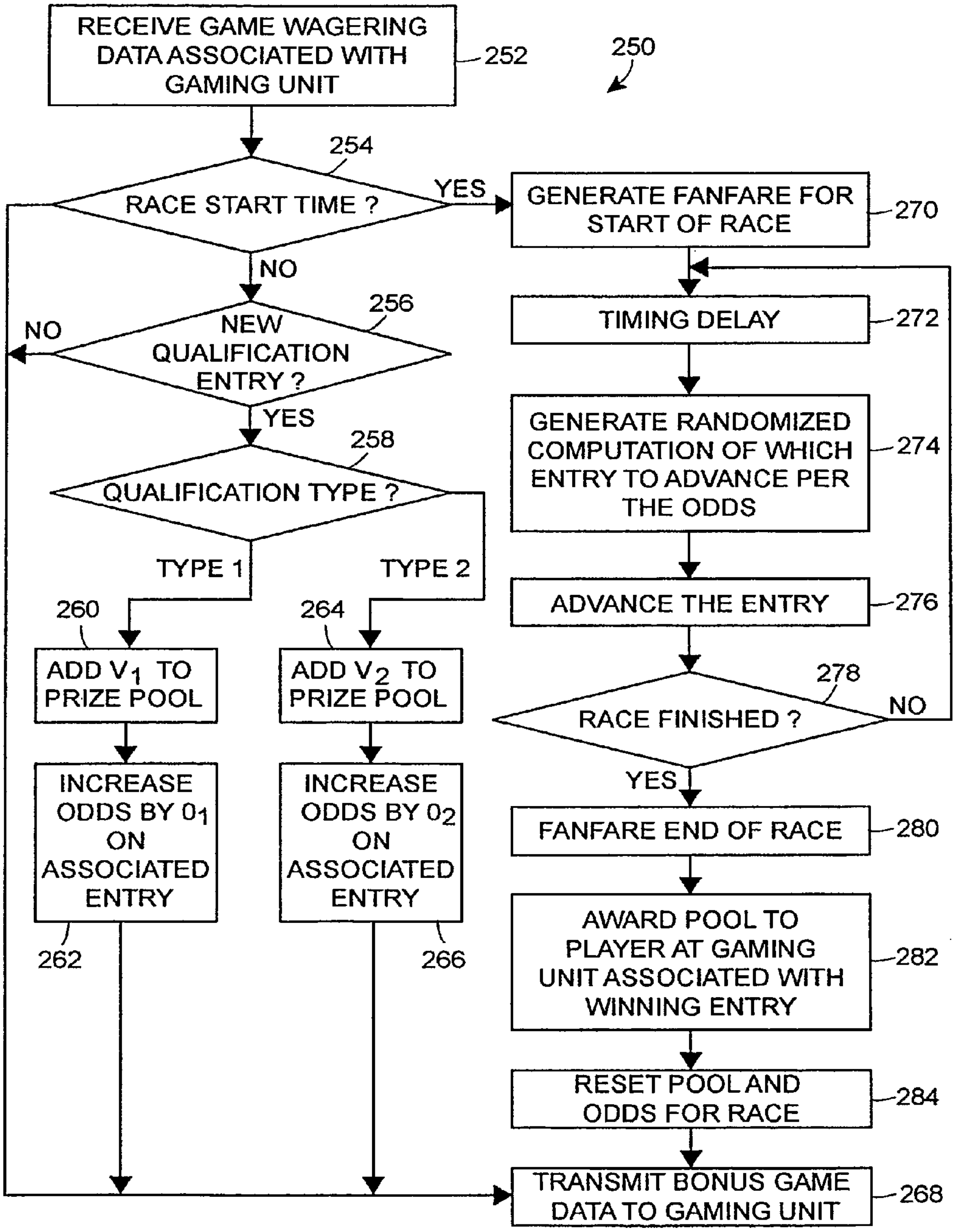
FIG. 10 is a flowchart of an alternative embodiment of a race-type competitive bonus routine that may be performed by the bonus controller.

FIG. 8 is an illustration of an embodiment of a visual display that may be displayed during performance of the race-type competitive bonus game that is initiated according to the routines of FIGS. 9 and 10. The visual display may appear on the display unit 70 of the gaming unit 20, and/or it maybe transmitted to the remote display 46 for display thereon. Referring to FIG. 8, a display 214 may include video images of a plurality of race cars 215 representing qualified entries into the race-type competitive bonus game. Each race car 215 may be associated with a player and/or a specific game unit 20. The display 214 may include an area 216 representing a finish line for the race and an area 217 that may be utilized to illustrate which of the cars 215 came in first, second, and third place.

The display 214 for the race-type competitive bonus game may include any number of bonus symbols, such as the illustrated cars. For example, boats, motorcycles, horses, and dogs, or any combination of different symbols may be used. Each bonus symbol may be associated with a gaming unit 20 by a distinct identifier. For example, the distinct identifier may be a color or combination of colors, number, or name that is displayed on the bonus symbol. The distinct identifier may be assigned to the gaming unit 20 or may be selected by the player. The player may select a distinct identifier by interacting with his or her gaming unit 20 as is readily known in the art. In the race, a predetermined number of bonus symbols may be available to players at a predetermined number of gaming units 20 that are linked to the bonus controller 44. For example, as shown in display 214, four race cars 215 are numbered one through 4 and are associated with four different gaming units 20. The number of gaming units 20, the number of cars 215, and the distinct identifiers illustrated in display 214 are shown merely to provide an example. It will be readily apparent to one of ordinary skill in the art that different numbers of gaming unit 20, cars 215, and distinct identifiers may be utilized within the scope of the present patent.

FIG. 9 is a flow chart of an embodiment of race-type competitive bonus routine 218 shown generically in FIG. 7. Referring to FIG. 9, at block 220 the bonus controller 44 may receive game wagering data associated with a play of a primary game at one of the gaming units 20. The routine 218 may then check to determine if it is time to start the race at block 222. If it is determined that it is not yet race time, the routine may determine if the play of the primary game is a qualifying entry for the competitive bonus game at block 224. If it is determined that the entry is a qualifying entry at block 224, the routine 218 may add the entry to the prize pool at block 226 and potentially increase the odds on the associated entry at block 228. As previously mentioned, increasing the odds on the associated entry may possibly include decreasing the odds for any other entries previously qualified for the race.

While all the players who qualify for the race-type competitive bonus game have a chance to win the race, the winner is determined in accord with the entry weights of the bonus symbols. Each bonus symbol may initially be assigned an entry weight of a base level (e.g., one, if the entry weight may not be decreased, or a larger number if the entry weight may be subsequently decreased). The value of the entry weight maybe be incrementally increased with each specific outcome or qualifying entry that occurs. The entry weight may also be increased based upon the wager amount of the primary game that resulted in the occurrence of this specific outcome. In other words, the player who wagers a larger amount in—the primary game may receive a higher entry weight than a player who wagers a lesser amount (e.g., the minimum amount). In addition, the entry weight may take into account the specific outcome that occurs. For example, the player who wins an entry with a specific outcome that includes four event symbols may have a higher entry weight than the player who wins with the occurrence of a specific outcome including three event symbols.

The odds of a specific racecar 215 winning the race may be calculated by dividing the entry weight of that race car 215 by the total entry weights of all the race cars. The entry weight of each race car may be displayed, either on the display unit 70 of the gaming unit 20 or the remote display 46, so that the player can determine the likelihood of winning the race-type competitive bonus game. However, it is also contemplated that the entry weights may not be displayed or may only be displayed on gaming units 20 with which one or more race cars 215 are associated.

It is also contemplated that the varied odds may be obtained in the race-type competitive bonus game by enabling players to accumulate multiple entries in the race. For example, each gaming unit 20 may be associated with multiple race cars 215 if one or more specific outcomes occur.

Still referring to FIG. 9, after varying the odds for the newly-qualified entry, and any other previously-qualified entries, the routine 218 may transmit bonus game data to the gaming units 20 at block 230. If it is determined at block 222 that it is time to start the race, the routine 218 may generate fanfare for the start of the race at block 232. This fanfare for the start of the race may include video data corresponding to the race and may be transmitted to the gaming units 20 and/or the remote display 46. The routine 218 may include a timing delay at block 234 before generating a randomized computation of which entry to advance according to the odds at block

236. The routine 218 may then advance the entry at block 238 and check to determine if the race is finished at block 240. If it is determined at block 240 that the race is not finished, the routine 218 may loop back to the block 234. If the race has finished, the routine 218 may generate fanfare corresponding to the end of the race at block 242, determine a bonus outcome of the race, and award the bonus outcome to the winning player at the gaming unit associated with the winning entry at block 244. The routine may then reset the pool and the odds for the race at block 246 and transmit bonus game data to the gaming units 20 and/or the remote display 236 at block 230.

FIG. 10 is a flow chart 250 of an alternative embodiment of a race-type competitive bonus game shown generically in FIG. 7. Referring to FIG. 10, at block 252 the bonus controller 44 may receive game wagering data associated with a play of a primary game at one of the gaming units 20. The routine 250 may then check to determine if it is time to start the race at block 254. If it is determined that it is not yet race time, the routine may determine if the play of the primary game is a qualifying entry for the competitive bonus game at block 256. If it is determined that the entry is a qualifying entry at block 256, the routine 250 may determine: a qualification type of the qualifying entry at block 258. If the qualifying entry is of a first type, the routine 250 may add the entry $V_1$ to the prize pool at block 260 and potentially increase the odds by $O_1$ on the associated entry at block 262. If the qualifying entry is of a second type, the routine 250 may add the entry $V_2$ to the prize pool at block 264 and potentially increase the odds by $O_2$ on the associated entry at block 266 As previously mentioned, increasing the odds on an associated entry may possibly include decreasing the odds for any other entries previously qualified for the race.

While all the players who qualify for the race-type competitive bonus game have a chance to win the race, the winner is determined in accord with the entry weights of the bonus symbols. Each bonus symbol may initially be assigned an entry weight of a base level (e.g., one, if the entry weight may not be decreased, or a larger number if the entry weight may be subsequently decreased). The value of the entry weight maybe be incrementally increased with each specific outcome or qualifying entry that occurs. The entry weight may also be increased based upon the wager amount of the primary game that resulted in the occurrence of this specific outcome. In other words, the player who wagers a larger amount in the primary game may receive a higher entry weight than a player who wagers a lesser amount (e.g., the minimum amount). In addition, the entry weight may take into account the specific outcome that occurs. For example, the player who wins an entry with a specific outcome that includes four event symbols may have a higher entry weight than the player who wins with the occurrence of a specific outcome including three event symbols.

It is also contemplated that the varied odds may be obtained in the race-type competitive bonus game by enabling players to accumulate multiple entries in the race. For example, each gaming unit 20 may be associated with multiple race cars 215 if one or more specific outcomes occur.

Figure 11:
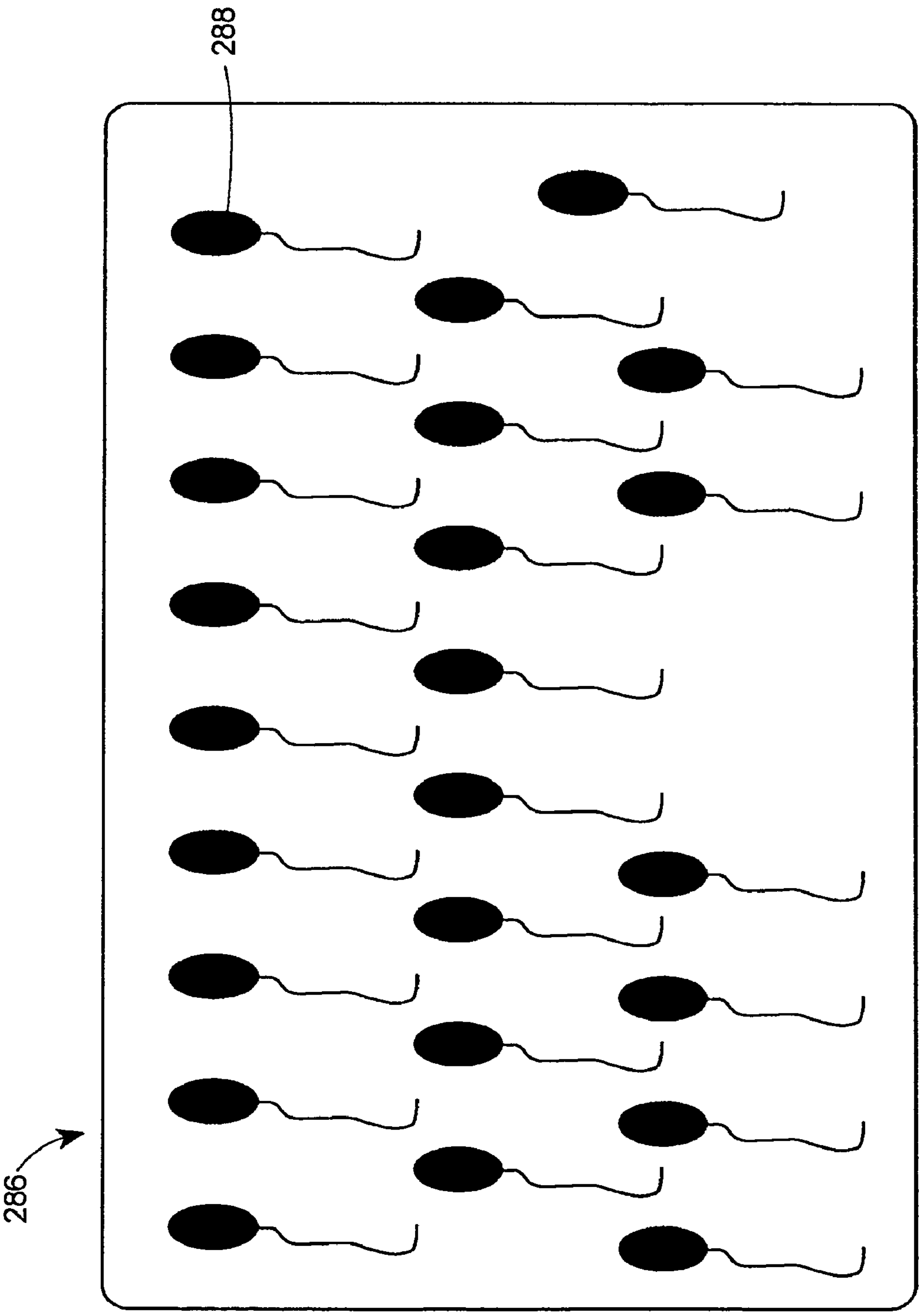
FIG. 11 is an illustration of an embodiment of a visual display that may be displayed during performance of the screen-clearing competitive bonus routine of FIG. 12.

Still referring to FIG. 10, after varying the odds for the newly-qualified entry, and perhaps any other previously-qualified entries, the routine 250 may transmit bonus game data to the gaming units 20 at block 268. If it is determined at block 254 that it is time to start the race, the routine 250 may generate fanfare for the start of the race at block 270. This fanfare for the start of the race may include video data corresponding to the race and may be transmitted to the gaming units 20 and/or the remote display 46. The routine 250 may include a timing delay at block 272 before generating a randomized computation of which entry to advance according to the odds at block 274. The routine 250 may then advance the entry at block 276 and check to determine if the race is finished at block 278. If it is determined at block 278 that the race is not finished, the routine 250 may loop back to the block 272. If the race has finished, the routine 250 may generate fanfare corresponding to the end of the race at block 280, determine a bonus outcome of the race, and award the bonus outcome to the winning player at the gaming unit associated with the winning entry at block 282. The routine may then reset the pool and the odds for the race at block 284 and transmit bonus game data to the gaming units 20 and/or the remote display 236 at block 268.

Where the bonus controller 44 is designed to facilitate play of a screen-clearing type game, an exemplary display 286 may be shown on a display unit 46, 70 as shown in FIG. 11. The exemplary display 286 may be generated during the performance of a screen-clearing type game routine 290 discussed in FIG. 12. Referring to FIG. 11, the display 286 may become populated with bonus symbols as players obtain qualifying entries into a competitive bonus game. Each bonus symbol may be associated with a gaming unit 20 with which a player obtained a qualifying entry into the competitive bonus game. The bonus symbol may be visibly associated with the gaming unit 20 so that an individual player may readily identify each bonus associated with his or her gaming unit 20. For example, each gaming unit 20 may have a specific color, combination of colors, or numbers associated with the bonus symbol. The bonus symbol may also be invisibly associated with the gaming unit 20 so that an individual player is not able to identify which bonus symbol is associated with his or her gaming unit 20. The display 286 may include a plurality of bonus symbols, such as, for example, the balloons 288.

Figure 12:
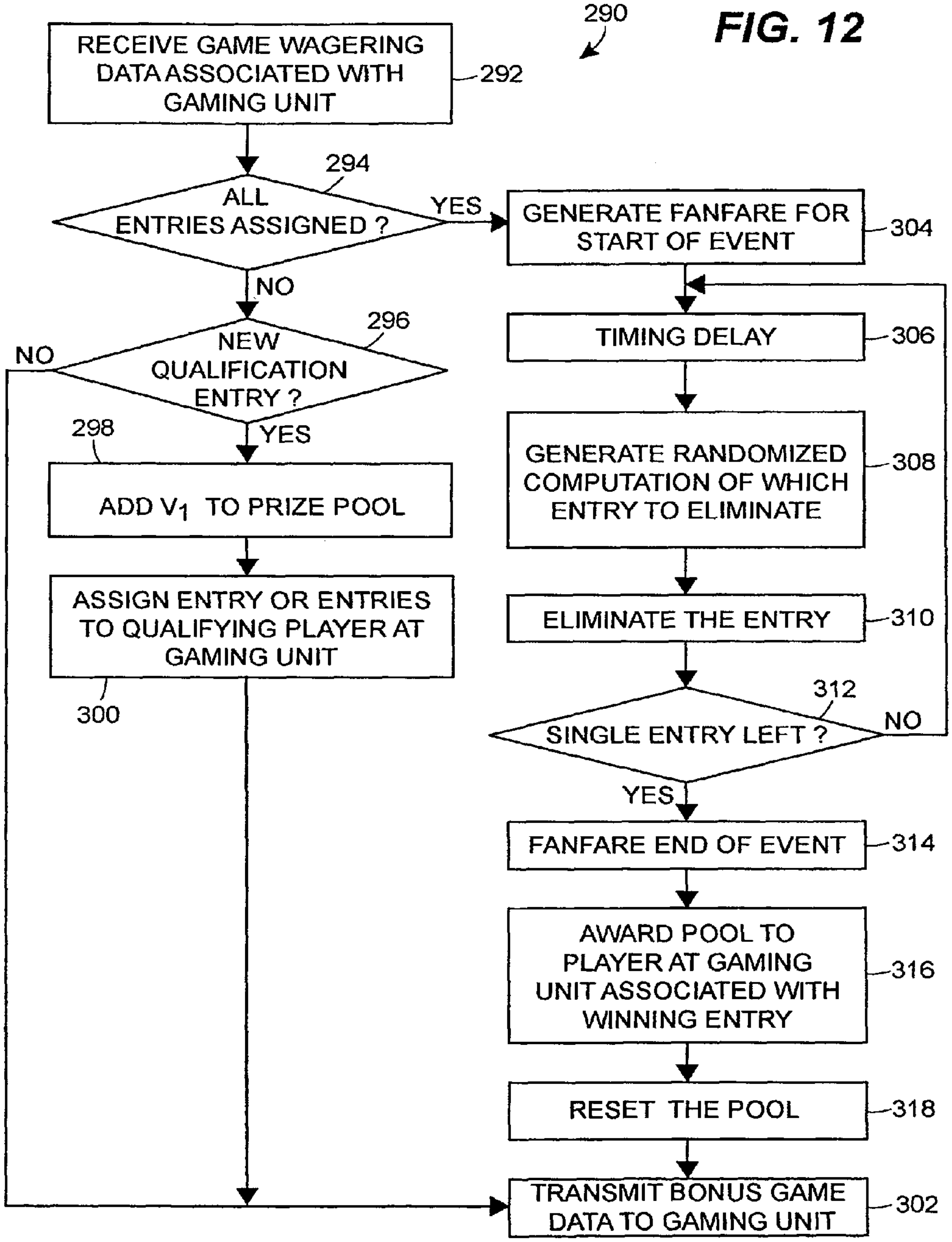
FIG. 12 is a flowchart of an embodiment of a screen-clearing competitive bonus routine that may be performed by the bonus controller.

FIG. 12 is a flow chart of an embodiment of screen-clearing type competitive bonus game routine 290 shown generically in FIG. 7. Referring to FIG. 12, at block 292 the bonus controller 44 may receive game wagering data associated with a play of a primary game at one of the gaming units 20. The routine 292 may then check to determine if all entries into the event have been assigned at block 294. If it is determined at block 294 that all entries have not been assigned, the routine 290 may then determine if the outcome of the primary game by the first player qualifies for entry into the screen-clearing type competitive bonus game at block 296. Entries into the screen-clearing type competitive bonus game may be achieved in a number of different ways, many of which have been discussed with regard to previous figures. If it is determined—at the block 296 that the outcome of the primary game was a qualifying entry, the routine 290 may add an entry $V_1$ to a prize pool for the competitive bonus game at block 298 and assign an entry or entries to the qualifying player at the gaming unit 20 at block 300. The routine 290 may then transmit bonus game data from the bonus controller 44 to the gaming unit 20 at block 302.

If it is determined at block 294 that all entries into the screen-clearing type competitive bonus game have been assigned, the routine 290 may generate fanfare for the start of the event at block 304 and initiate a timing delay at block 306. Thereafter, the routine 290 may generate a randomized computation of which entry to eliminate at block 308 and may continue thereafter eliminating the appropriate entry at block 310. The routine 290 may then determine if the screen-clearing type competitive bonus game has a single entry left at block 312. If it is determined at block 312 that there are more than one entry left, the routine 290 may loop back to the timing delay at block 306. If it is determined at block 312 that only a single entry remains in the screen-clearing type competitive bonus game, the routine 290 may generate fanfare for the end of the event of block 314 and award the pool to the player at the gaming unit 20 associated with the winning entry at block 316. The routine 290 may then reset the pool at block 318 and transmit data corresponding to the bonus game to the gaming unit 20 and/or the remote display 46. In summary, once the display 286 from FIG. 11 is populated with a predetermined number of bonus symbols, the screen-clearing type game may be played by randomly removing bonus symbols, one at a time, until only one bonus symbol is displayed on the display 286. If the predetermined number of bonus symbols is not awarded to players within a predetermined amount of time, the bonus symbols may be randomly removed once the predetermined amount of time has elapsed. The winner of the competitive bonus game is the player of the gaming unit 20 that is associated with the last bonus symbol displayed.

Generating the fanfare for the start of the event may include displaying a sky scene that becomes populated with balloons as the players obtain qualifying entries into the competitive bonus game. The balloons may appear to be drifting around the screen. When a predetermined number of balloons have appeared on the feature event on the display 286, the balloons begin popping until only one balloon is remaining. For the sake of example only, the predetermined number of balloons is 23. In addition, if a predetermined time limit, such as ten minutes has passed without reaching the predetermined number of balloons, the balloons may begin popping regardless of the number of balloons displayed on the display 286. The gaming unit 20 associated with the last balloon remaining on the display 286 wins the bonus pool.

Numerous variations to this embodiment may fall within the scope of this patent. The prize structure may utilize parimutuel betting to award prizes for multiple event outcomes instead of the fixed approach described above. For example, the last two balloons remaining on the display 286 may qualify for the bonus pool, with the higher-positioned balloon earning a larger percentage of the pool. In addition, different game outcomes may yield varying numbers of bonus credits required to receive the balloon or different numbers of balloons. Furthermore, the popping of balloons may be started by other events, such as the occurrence of a specific outcome in continued play of the primary game. In this situation, the gaming unit 20 that started the popping may win a portion of the bonus pool. Consolation prizes may be awarded for non-winning entries. For instance, consolation prizes may be randomly awarded when a non-winning balloon pops.

It is also contemplated that the player may increase the odds that one or more of his or her bonus symbols will win the screen-clearing type competitive bonus game by increasing the amount of his or her wager. For example, if a player bet two credits, rather than one credit, his or her odds of being the last bonus symbols displayed on the display 286 may be increased by increasing an entry weight associated with that bonus symbol.

It should also be noted that the bonus prize pool may be initially set to zero, or alternatively, the bonus prize pool may be set to a minimum monetary amount. As players qualify for the screen-clearing type competitive bonus game, the bonus prize pool may be credited with a fixed number of credits for each bonus symbol that displayed on the display 286. After the end of the event, the player of the gaming unit 20 that is associated with the last bonus symbol displayed may receive a number of credits identified in the bonus prize pool.

Figure 13:
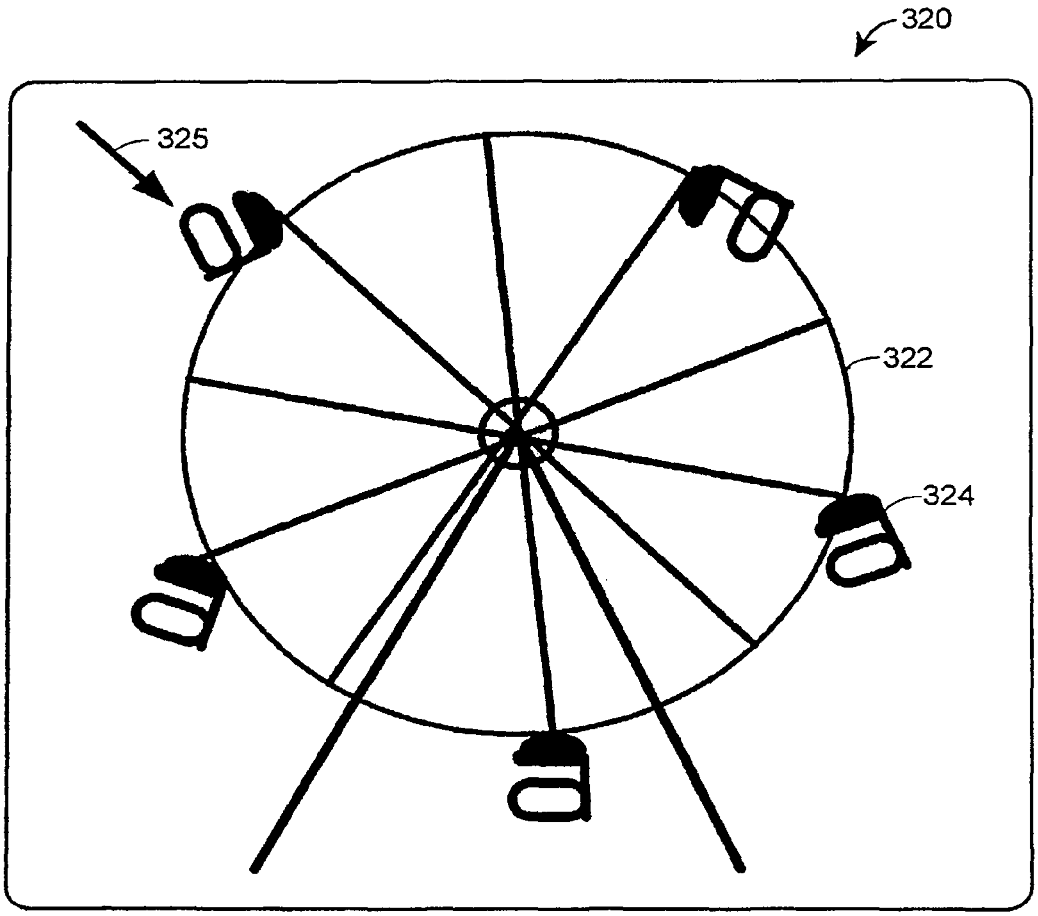
FIG. 13 is an illustration of an embodiment of a visual display that may be displayed during performance of the ferris wheel type competitive bonus routine of FIG. 12.
Figure 14:
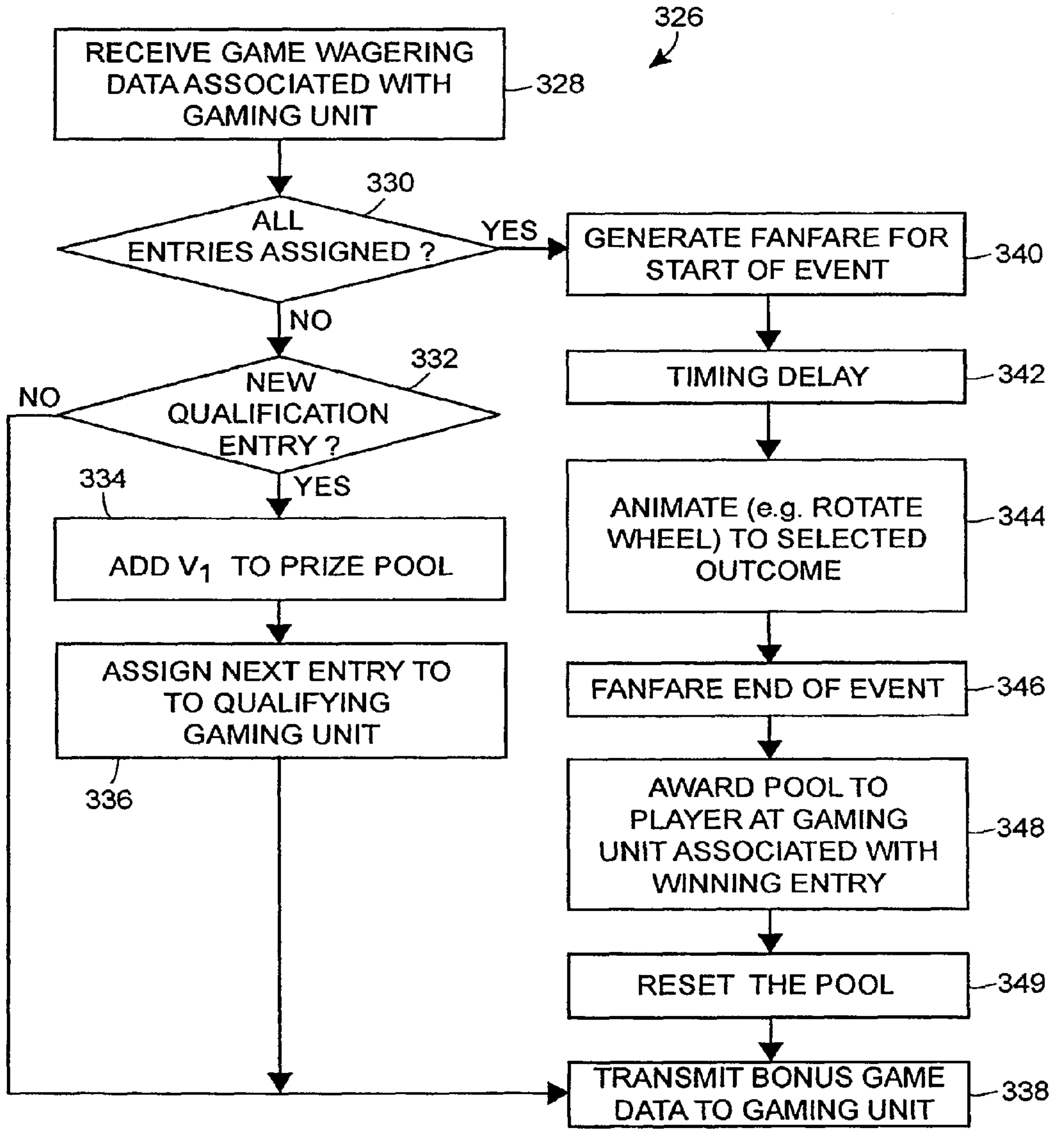
FIG. 14 is a flowchart of an embodiment of a ferris wheel type competitive bonus routine that may be performed by the bonus controller.

In the screen-clearing game illustrated in FIG. 11, each player may have multiple bonus symbols simultaneously displayed on the display 286, depending on the number of specific outcomes or qualifying entries the player accumulates. Each player's odds of winning the screen-clearing competitive bonus game depend on the number of bonus symbols he or she has accumulated. The player who has accumulated more bonus symbols has greater odds of winning the game than the player who has accumulated one bonus symbol.

Where the bonus controller 44 is designed to facilitate play of an electromechanical (i.e., Ferris wheel) competitive bonus game, an exemplary display 320 of FIG. 13 may be generated during a performance of the Ferris wheel type competitive bonus routine 326 discussed in FIG. 14. The exemplary display 320—shown in FIG. 13 may be an electromechanical device or a video simulation thereof of a Ferris wheel 322. The electromechanical device may include a predetermined number of stations that include rotatable elements 324 with identifiers for each of the gaming units 20 that are linked to the bonus controller 44 and an additional "unawarded" identifier, as well as a win indicator 325 that points to an adjacent station. When a position on the Ferris wheel 322 has been awarded to a player at a particular gaming unit 20, the rotatable element 324 rotates or the win indicator 325 moves so that the indicator associated with the gaming unit 20 is positioned adjacent the win indicator 325. Alternatively, each position on the electromechanical device may include a receptacle for receiving a bonus symbol, such as a ball or figurine, labeled with an identifier associated with the gaming unit 20 at which the entry was awarded. As another example, bonus symbols may be displayed adjacent the periphery of the electromechanical device which is rotatable and includes a win indicator 325 that may be positioned adjacent to a winning bonus symbol.

FIG. 14 is a flow chart of a Ferris wheel type competitive bonus routine 326 for the display of the Ferris wheel 322 shown in the display 320 of FIG. 13. Referring to FIG. 14, the Ferris wheel type competitive bonus routine 326 may begin at block 328 where the bonus controller 44 receives game wagering data associated with a gaming unit 20. The routine 326 may then determine at block 330 if all entries into the Ferris wheel 322 have been assigned. If one or more of the stations 324 remain unassigned as determined at block 330, the routine 326 may check to see if the game wagering data corresponding to a play of the primary game at the gaming unit 20 was eligible for a qualifying entry at block 332. If it is determined at block 332 that the entry is a qualifying entry, the routine 326 may add $V_1$ to a prize pool at block 334 and assign the next entry or station 324 to the player at the qualifying gaming unit 20 at block 336. Thereafter, the routine 326 may transmit game data corresponding to the competitive bonus game to the gaming unit 20 and/or the remote display 46 at block 338.

If it is determined at block 330 that all the entries in the Ferris wheel type competitive bonus game have been assigned, the routine 326 may generate fanfare for the start of the event at block 340 and generate a randomized computation of which entry will win the competitive bonus game at block 342. The routine 326 may then animate the display (e.g., rotate the Ferris wheel 322) to the selected outcome at block 344. The routine 326 may then generate fanfare for the end of the event at block 346 and award a bonus pool to the player at the gaming unit 20 associated with the winning entry at block 348. The routine 326 may then reset the bonus pool at block 349 and transmit game data to the gaming unit 20 and/or the remote display 46 at block 338.

It should be noted that each gaming unit 20 may be associated with more than one station if it accumulates more than one specific outcome or qualifying entry in a primary game. When the last station has been associated with a player/gaming unit 20, the competitive bonus game may be played by rotating or revolving the stations 324 past the win-indicator 325. The winner of the game is determined by the station upon which the win-indicator 325 stops.

Regardless of the type of competitive bonus game utilized, the player may be notified that he or she has qualified for the competitive bonus game by an interaction with his or her gaming unit 20. By way of example, this interaction may occur by the appearance of a message on the display unit 70 of the gaming unit 20. Once activated, the competitive bonus game may start immediately. The game may also start, for example, automatically, on a periodic or random basis. (e.g., every ten, minutes), when at least one specific outcome occurs during play of the primary game, when a player in the primary game accumulates a specific number of points, when the game play amount or number of players in the primary game reaches a specific threshold, or when all entries in the competitive bonus game have been won. In addition, the competitive bonus game may run on a continuous basis, with a new bonus game beginning following the conclusion of a previous bonus game.

When the competitive bonus game is ready to start, the players currently qualified to participate may be queried through the gaming units 20, as to whether they wish to participate in the competitive bonus game. These players may choose to participate at that time or defer participating until they have accumulated additional specific outcomes or qualifying entries. Alternatively, the players may be automatically entered into the competitive bonus game and advised of their entry through the gaming unit 20.

The display 320 of the Ferris wheel type competitive bonus game may utilize an electromechanical device or video simulation thereof. Initially, as mentioned above, all the Ferris wheel seats are empty and may be indicated as such by the display of a "not yet won" indicator. The player may qualify for the competitive bonus game, for example, by obtaining a Ferris wheel symbol on the final reel of a slot machine. When the player obtains the Ferris wheel symbol, the first Ferris wheel seat may be assigned to that gaming unit 20. The seat may then be identified as being won by rotating the Ferris wheel 322 to the specific character associated with the gaming unit 20. The specific character may appear to be sitting in or occupying, the seat of the Ferris wheel. The Ferris wheel may then be rotated so that the next empty seat can be filled when another player qualifying for the competitive bonus game. This process is similar to loading people onto a Ferris wheel. When all the available seats on the Ferris wheel have been won, the Ferris wheel may be spun and allowed to come to a stop. This is referred to as animating the event. The player/gaming unit 20 associated with the seat that stops proximate the win-indicator 325 may be awarded the bonus prize.

PRIMARY GAMES

Figure 15:
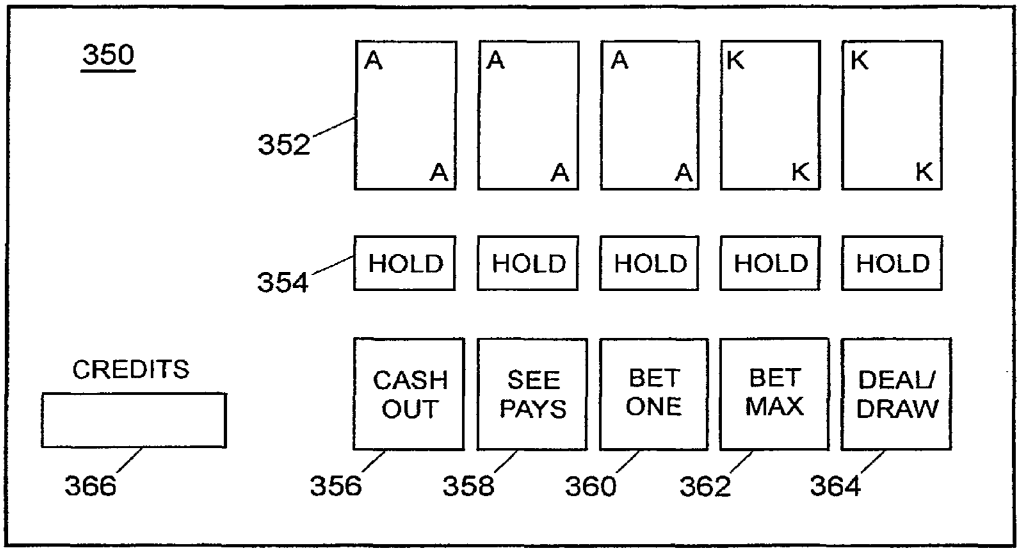
FIG. 15 is an illustration of an embodiment of a visual display that may be displayed during performance of the video poker routine of FIG. 17.

Video Poker

Where the gaming unit 20 is designed to facilitate play of a video poker game, the display unit 70 may comprise a video display unit. FIG. 15 is an exemplary display 350 that may be shown on the display unit 70 during performance of the video poker routine 142 shown schematically in FIG. 5. Referring to FIG. 15, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 17:
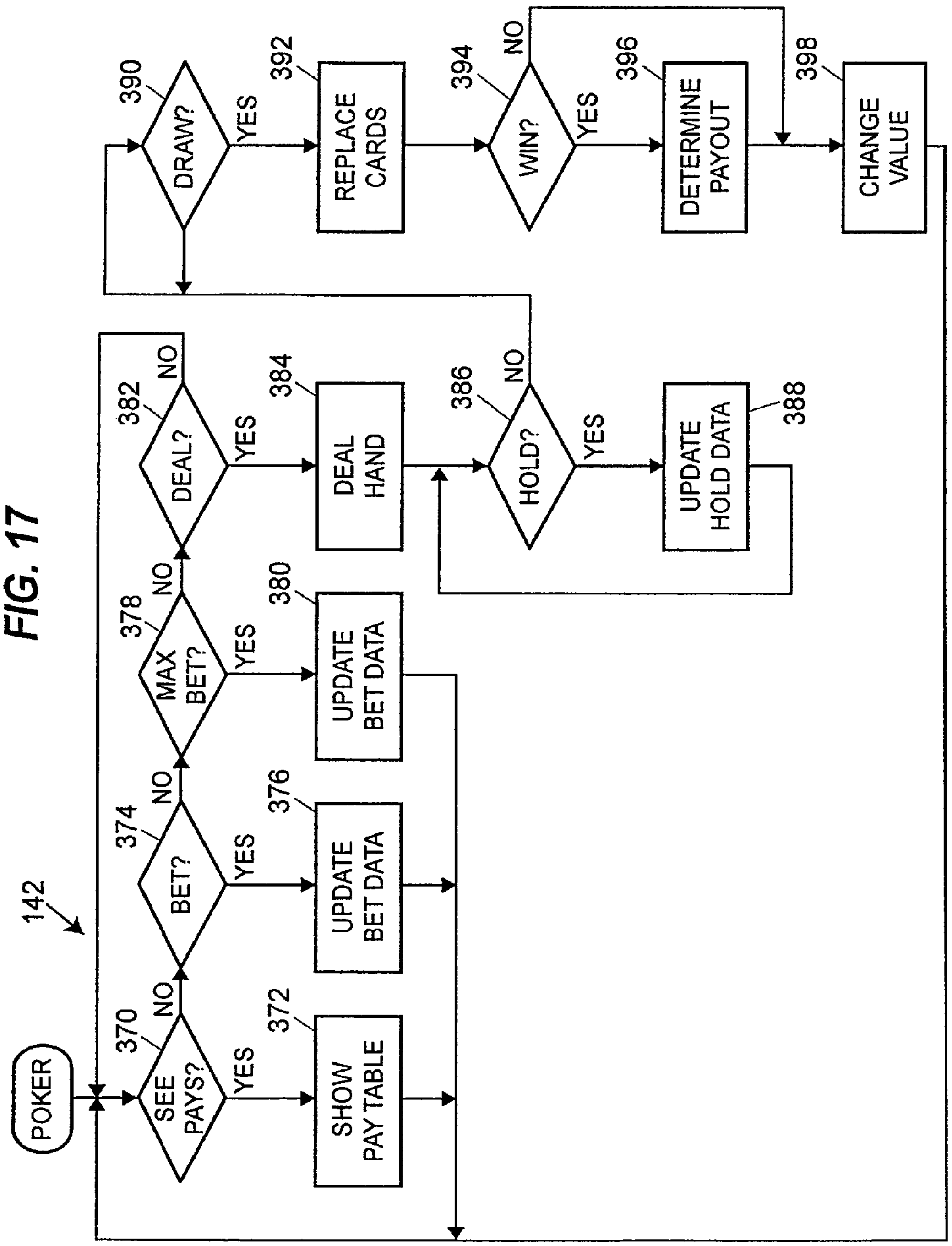
FIG. 17 is a flowchart of an embodiment of a video poker routine that may be performed by one or more of the gaming units.

FIG. 17 is a flowchart of the video poker routine 142 shown schematically in FIG. 5. Referring to FIG. 17, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that were not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 15).

Although the video poker routine 142 is described above in connection with a single poker hand of five cards, the routine 142 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 16:
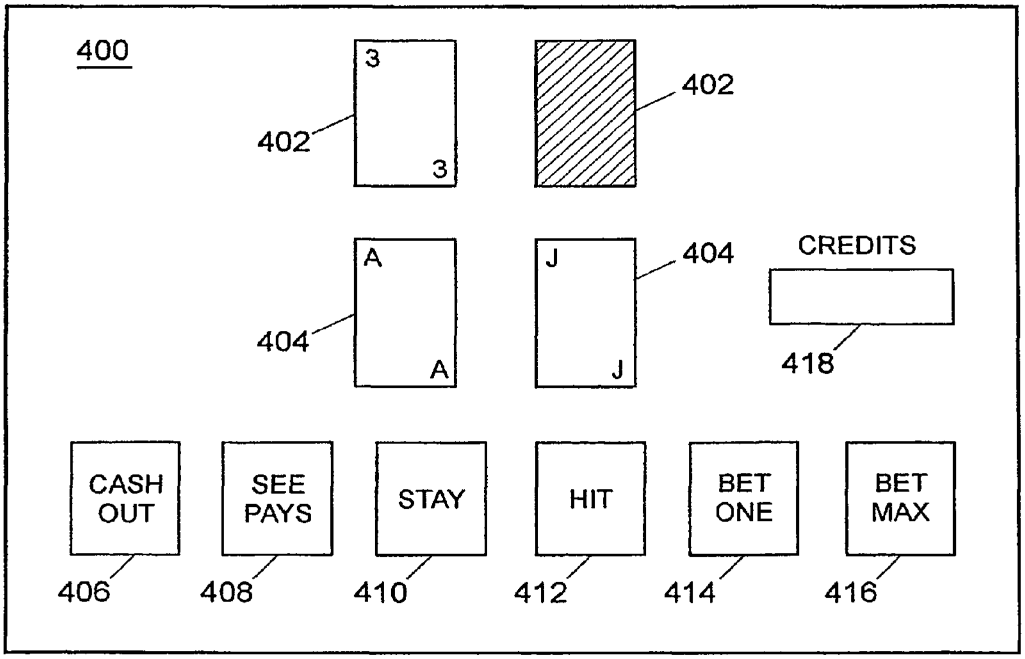
FIG. 16 is an illustration of an embodiment of a visual display that may be displayed during performance of the video blackjack routine of FIG. 18.

Video Blackjack

Where the gaming unit 20 is designed to facilitate play of a video blackjack game, the display unit 70 may comprise a video display unit. FIG. 16 is an exemplary display 400 that may be shown on the display unit 70 during performance of the video blackjack routine 144 shown schematically in FIG. 5. Referring to FIG. 16, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 18:
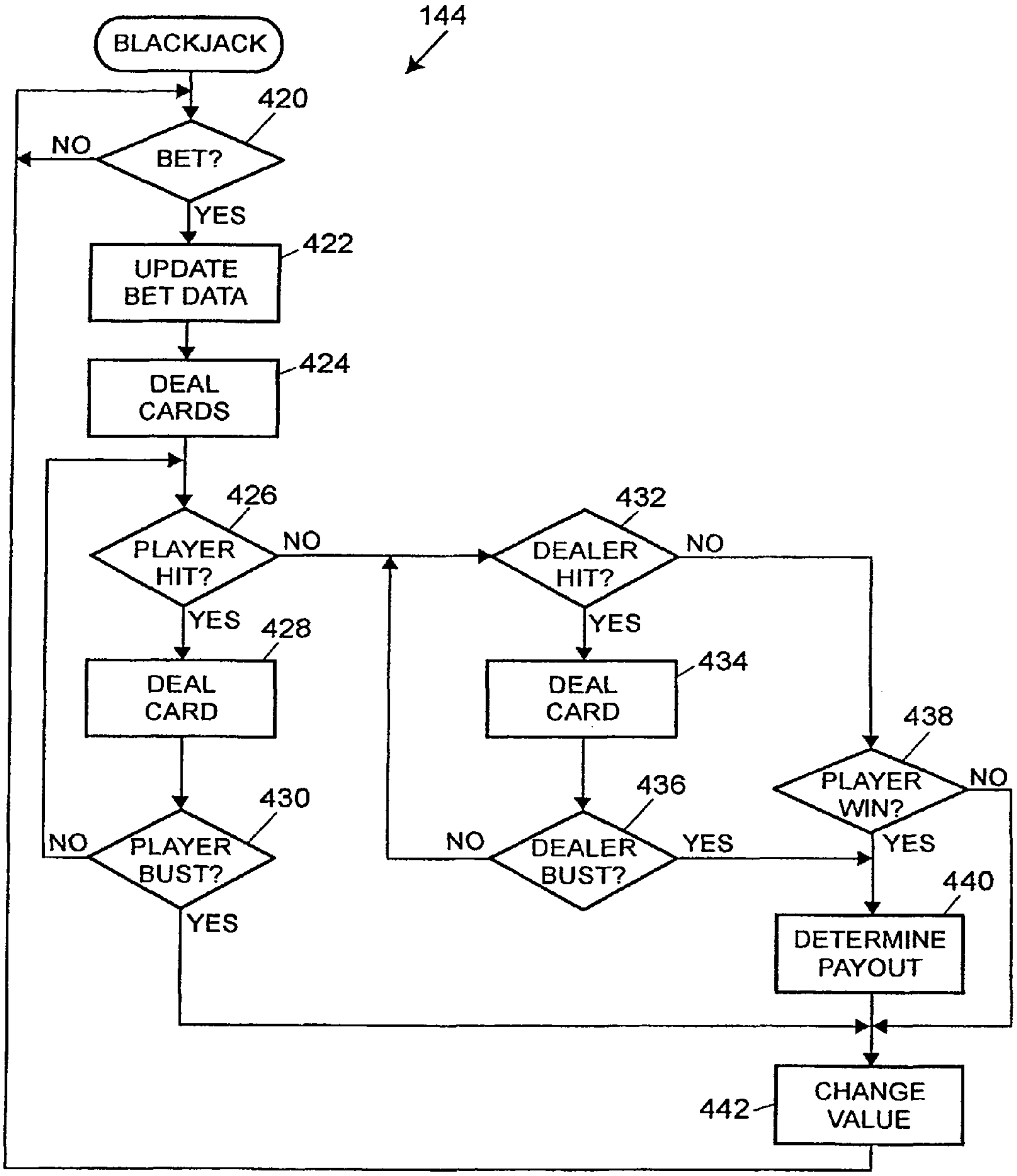
FIG. 18 is a flowchart of an embodiment of a video blackjack routine that may be performed by one or more of the gaming units.

FIG. 18 is a flowchart of the video blackjack routine 144 shown schematically in FIG. 5. Referring to FIG. 18, the video blackjack routine 144 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 16).

Figure 19:
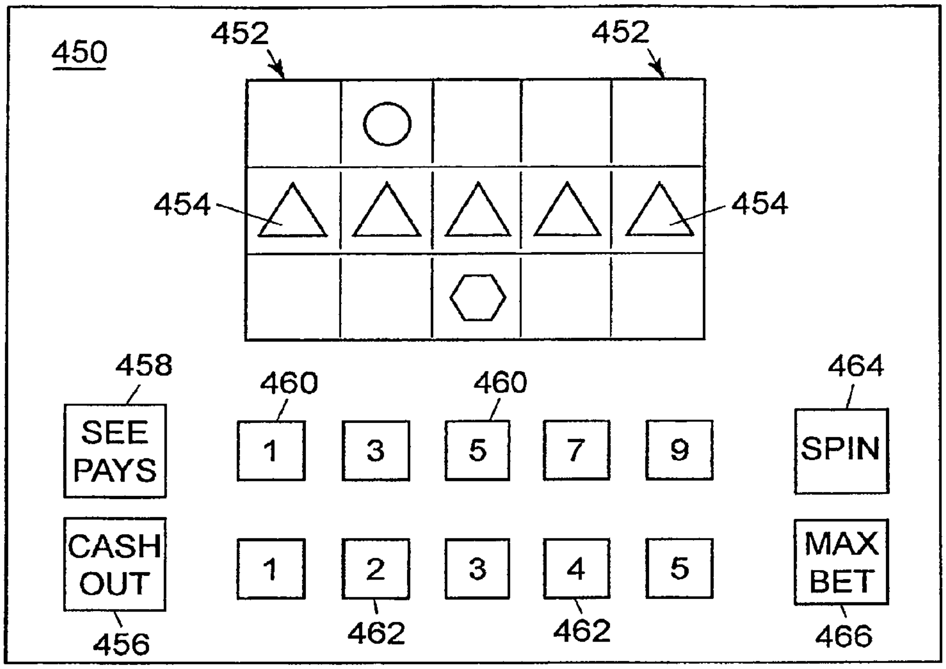
FIG. 19 is an illustration of an embodiment of a visual display that may be displayed during performance of the slots routine of FIG. 21.

Slots

Where the gaming unit 20 is designed to facilitate play of a video slots game, the display unit 70 may comprise a video display unit. FIG. 19 is an exemplary display 450 that may be shown on the display unit 70 during performance of the slots routine 146 shown schematically in FIG. 5. Referring to FIG. 19, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 21:
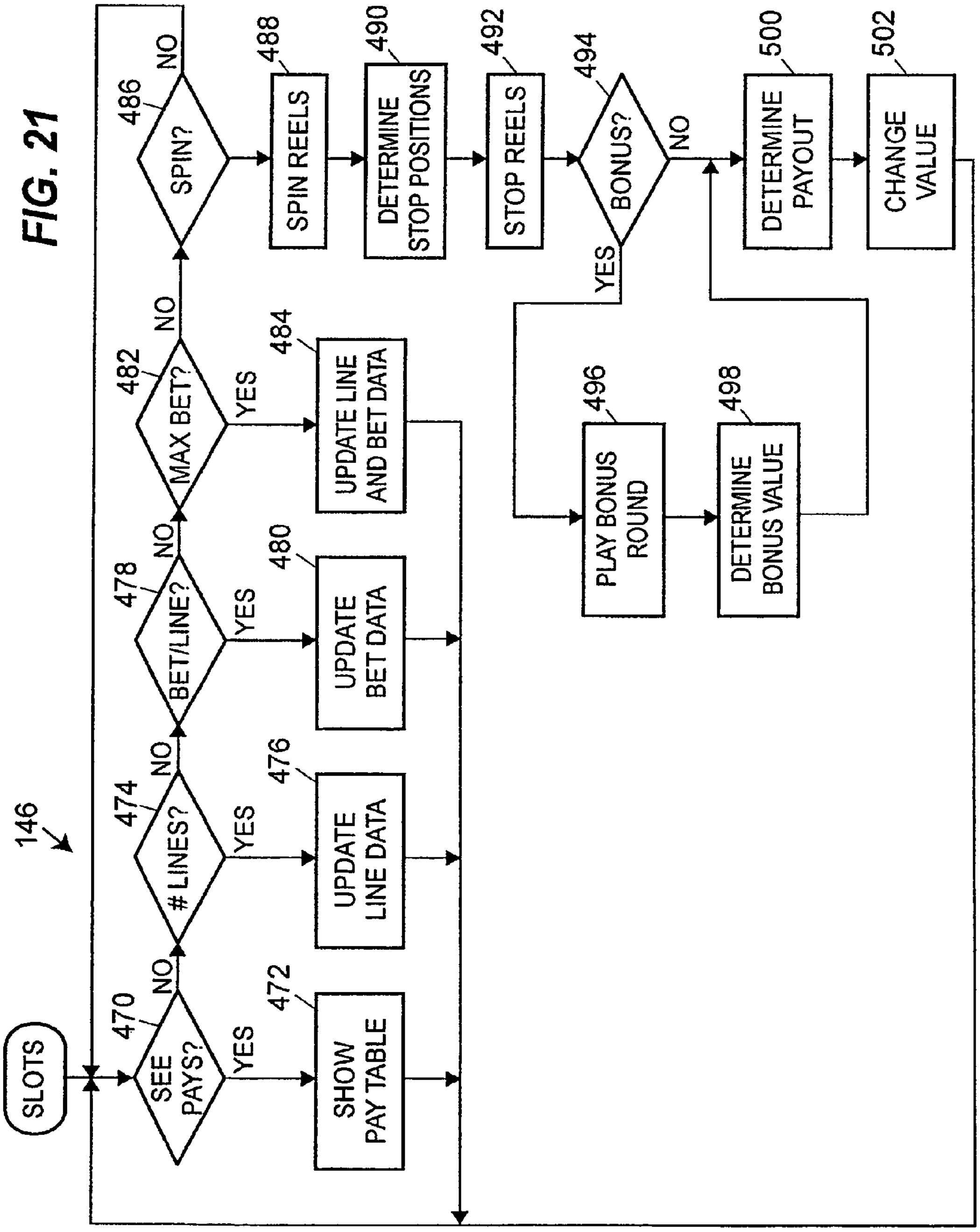
FIG. 21 is a flowchart of an embodiment of a slots routine that may be performed by one or more of the gaming units.

FIG. 21 is a flowchart of the slots routine 146 shown schematically in FIG. 19. Referring to FIG. 21, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead, in which case the display unit 70 could be provided in the form of a plurality of mechanical reels that are rotatable, each of the reels having a plurality of reel images disposed thereon.

Figure 20:
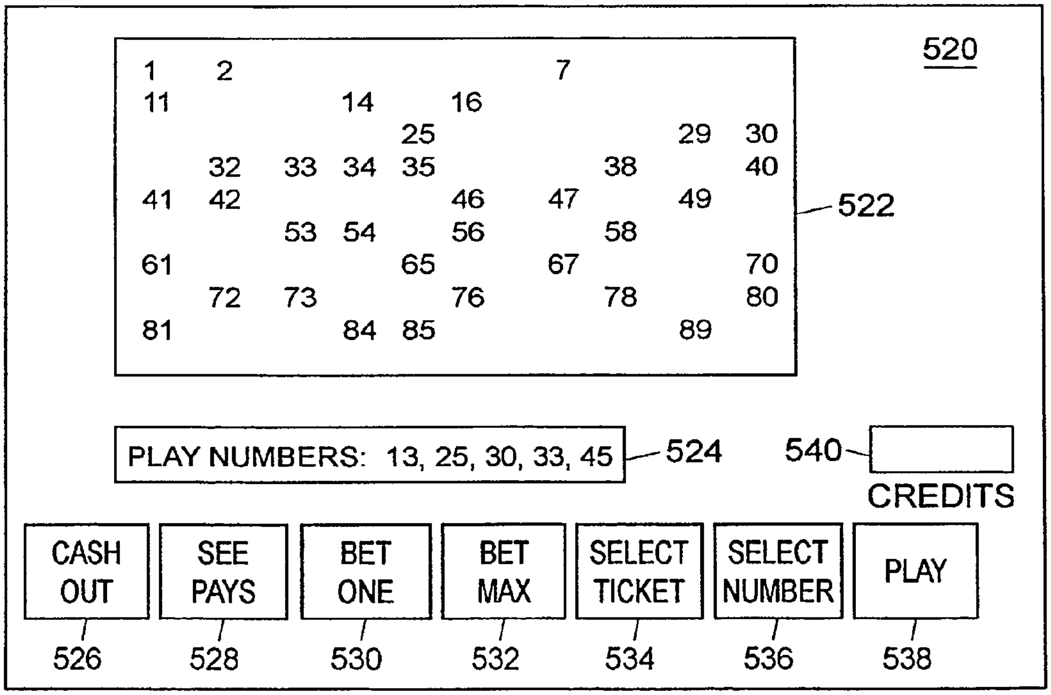
FIG. 20 is an illustration of an embodiment of a visual display that may be displayed during performance of the video keno routine of FIG. 22.

Video Keno

Where the gaming unit 20 is designed to facilitate play of a video keno game, the display unit 70 may comprise a video display unit. FIG. 20 is an exemplary display 520 that may be shown on the display unit 70 during performance of the video keno routine 148 shown schematically in FIG. 5. Referring to FIG. 20, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 22:
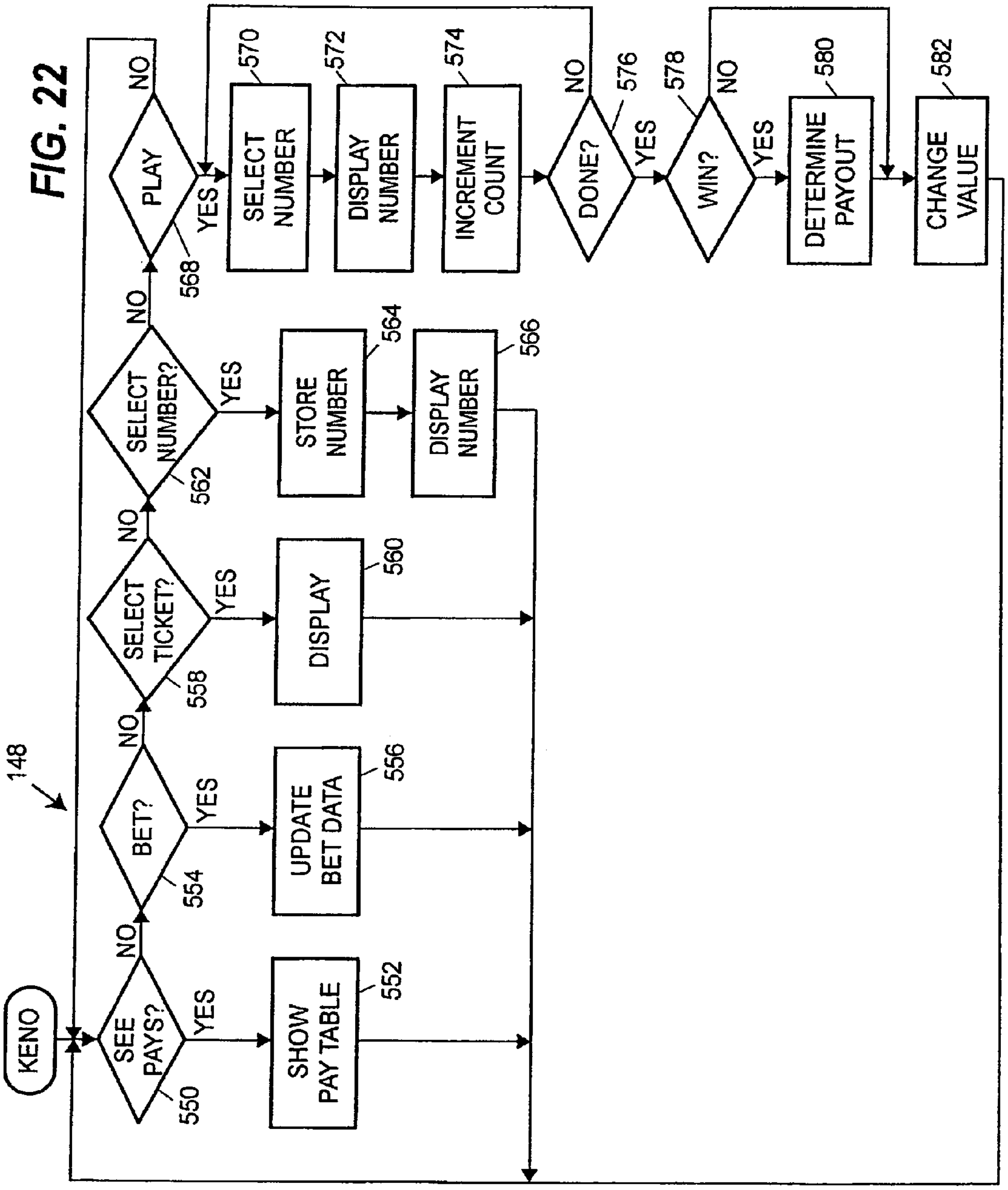
FIG. 22 is a flowchart of an embodiment of a video keno routine that may be performed by one or more of the gaming units.

FIG. 22 is a flowchart of the video keno routine 148 shown schematically in FIG. 5. The keno routine 148 may be utilized in connection with a single gaming unit 20 where a single player is playing a keno game, or the keno routine 148 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 22, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 20).

Figure 23:
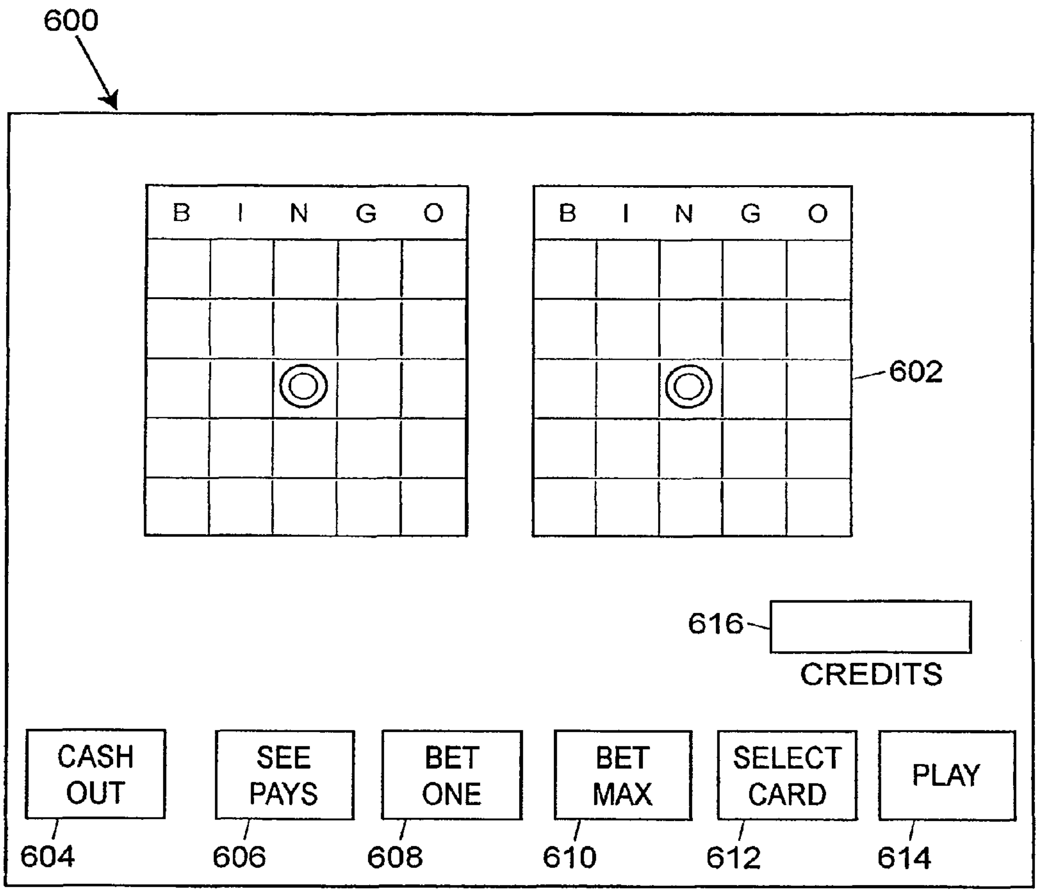
FIG. 23 is an illustration of an embodiment of a visual display that may be displayed during performance of the video bingo routine of FIG. 24.

Video Bingo

Where the gaming unit 20 is designed to facilitate play of a video bingo game, the display unit 70 may comprise a video display unit. FIG. 23 is an exemplary display 600 that may be shown on the display unit 70 during performance of the video bingo routine 150 shown schematically in FIG. 5. Referring to FIG. 23, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 24:
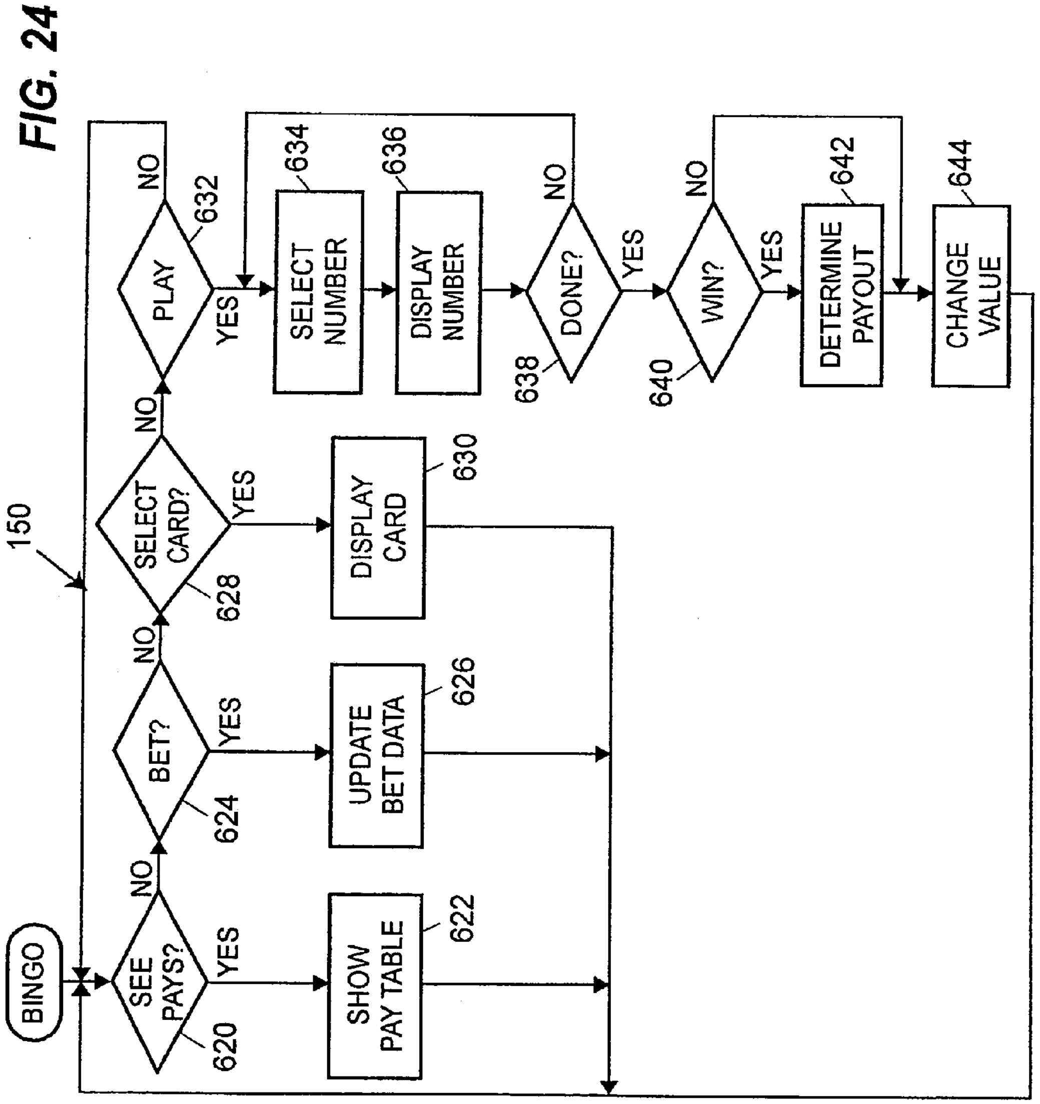
FIG. 24 is a flowchart of an embodiment of a video bingo routine that may be performed by one or more of the gaming units.

FIG. 24 is a flowchart of the video bingo routine 150 shown schematically in FIG. 5. The bingo routine 150 may be utilized in connection with a single gaming unit 20 where a single player is playing a bingo game, or the bingo routine 150 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 24, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 23). It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A gaming system comprising:
a plurality of gaming apparatuses, each gaming apparatus including:
at least one display unit operable to display a primary game and a bonus game, and
at least one input device; and
at least one controller configured to operate with said gaming apparatuses to:
(a) determine if a qualifying event occurs in association with one of said gaming apparatuses;
(b) if the qualifying event occurs in association with one of said gaming apparatuses, associate at least one of a plurality of bonus game entries with said gaming apparatus, wherein a quantity of associated bonus game entries is based, at least in part, on an amount wagered on at least one play of the primary game of said gaming apparatus;
(c) thereafter, repeat (a) to (b) at least once, wherein (a) to (b) are repeated until a determination occurs to initiate the bonus game, the determination to initiate the bonus game occurring distinct from any occurrence of the qualifying event, and each of said plurality of bonus game entries being associated with said plurality of gaming apparatuses prior to the initiation of said bonus game; and
(d) when the determination to initiate the bonus game occurs, for each initiated bonus game:
(i) randomly select one of said associated bonus game entries,
(ii) eliminate said selected bonus game entry,
(iii) thereafter, repeat (i) to (ii) at least once, wherein (i) to (ii) are repeated until a predetermined quantity of the associated bonus game entries remain, and
(iv) cause any of the gaming apparatuses associated with the remaining predetermined quantity of bonus game entries to display and provide an award.

2. The gaming system of claim 1, wherein said determination to initiate the bonus game occurs when each of said plurality of bonus game entries are associated with at least one of said gaming apparatuses.

3. The gaming system of claim 1, wherein the determination to initiate the bonus game occurs based on time.

4. The gaming system of claim 1, wherein said provided award is a progressive award.

5. A method of operating a gaming system, said method comprising:
(a) causing a plurality of gaming apparatuses to each display a primary game and a bonus game; and
(b) causing at least one controller configured to operate with said gaming apparatuses to:
(i) determine if a qualifying event occurs in association with one of said gaming apparatuses;
(ii) if the qualifying event occurs in association with one of said gaming apparatuses, associate at least one of a plurality of bonus game entries with said gaming apparatus, wherein a quantity of associated bonus game entries is based, at least in part, on an amount wagered on at least one play of the primary game of said gaming apparatus;
(iii) thereafter, repeat (i) to (ii) at least once, wherein (i) to (ii) are repeated until a determination occurs to initiate the bonus game, the determination to initiate the bonus game occurring distinct from any occurrence of the qualifying event, and each of said plurality of bonus game entries being associated with said plurality of gaming apparatuses prior to the initiation of said bonus game; and
(iv) when the determination to initiate the bonus game occurs, for each initiated bonus game:
(A) randomly select one of said associated bonus game entries,
(B) eliminate said selected bonus game entry,
(C) thereafter, repeat (A) to (B) at least once, wherein (A) to (B) are repeated until a predetermined quantity of the associated bonus game entries remain, and
(D) cause any of the gaming apparatuses associated with the remaining predetermined quantity of bonus game entries to display and provide an award.

6. The method of claim 5, wherein said determination to initiate the bonus game occurs when each of said plurality of bonus game entries are associated with at least one of said gaming apparatuses.

7. The method of claim 5, wherein the determination to initiate the bonus game occurs based on time.

8. The method of claim 5, wherein said provided award is a progressive award.

9. The method of claim 5, which is provided through a data network.

10. The method of claim 9, wherein the data network is the internet.

11. A non-transitory computer readable medium including a plurality of instructions, which when executed by at least one processor, cause the at least one processor to:

(a) cause a plurality of gaming apparatuses to each display a primary game and a bonus game; and (b) cause at least one controller configured to operate with said gaming apparatuses to:

(i) determine if a qualifying event occurs in association with one of said gaming apparatuses;

(ii) if the qualifying event occurs in association with one of said gaming apparatuses, associate at least one of a plurality of bonus game entries with said gaming apparatus, wherein a quantity of associated bonus game entries is based, at least in part, on an amount wagered on at least one play of the primary game of said gaming apparatus;

(iii) thereafter, repeat (i) to (ii) at least once, wherein (i) to (ii) are repeated until a determination occurs to initiate the bonus game, the determination to initiate the bonus game occurring distinct from any occurrence of the qualifying event, and each of said plurality of bonus game entries being associated with said plurality of gaming apparatuses prior to the initiation of said bonus game; and (iv) when the determination to initiate the bonus game occurs, for each initiated bonus game:

(A) randomly select one of said associated bonus game entries, (B) eliminate said selected bonus game entry, (C) thereafter, repeat (A) to (B) at least once, wherein (A) to (B) are repeated until a predetermined quantity of the associated bonus game entries remain, and (D) cause any of the gaming apparatuses associated with the remaining predetermined quantity of bonus game entries to display and provide an award.

12. The non-transitory computer readable medium of claim 11, wherein said determination to initiate the bonus game occurs when each of said plurality of bonus game entries are associated with at least one of said gaming apparatuses.

13. The non-transitory computer readable medium of claim 11, wherein the determination to initiate the bonus game occurs based on time.

14. The non-transitory computer readable medium of claim 11, wherein said provided award is a progressive award.

* * * * *

UNITED STATES PATENT AND TRADEMARK OFFICE

CERTIFICATE OF CORRECTION

PATENT NO. : 8,100,760 B2
APPLICATION NO. : 11/871837
DATED : January 24, 2012
INVENTOR(S) : Lee E. Cannon It is certified that error appears in the above-identified patent and that said Letters Patent is hereby corrected as shown below:

IN THE CLAIMS:

In column 28, claim 1, line 8, replace “remain” with --remains--.

In column 28, claim 1, line 12, before “bonus” add --the associated--.

In column 28, claim 2, line 16, replace “are” with --is--.

In column 28, claim 5, line 52, replace “remain” with --remains--.

In column 28, claim 5, line 56, before “bonus” add --the associated--.

In column 28, claim 6, line 60, replace “are” with --is--.

In column 30, claim 11, line 8, replace “remain” with --remains--.

In column 30, claim 11, line 12, before “bonus” add --the associated--.

In column 30, claim 12, line 16, replace “are” with --is--.

Signed and Sealed this
Ninth Day of April, 2013

Teresa Stanek Rea
*Acting Director of the United States Patent and Trademark Office*